United States Patent
Katayama et al.

(10) Patent No.: US 11,820,912 B2
(45) Date of Patent: Nov. 21, 2023

(54) FLUOROPOLYETHER GROUP-CONTAINING POLYMER-MODIFIED ORGANIC SILICON COMPOUND, SURFACE TREATMENT AGENT, AND ARTICLE

(71) Applicant: SHIN-ETSU CHEMICAL CO., LTD., Tokyo (JP)

(72) Inventors: Lisa Katayama, Annaka (JP); Takashi Matsuda, Annaka (JP); Yuji Yamane, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 539 days.

(21) Appl. No.: 16/616,320

(22) PCT Filed: Apr. 19, 2018

(86) PCT No.: PCT/JP2018/016121
§ 371 (c)(1),
(2) Date: Nov. 22, 2019

(87) PCT Pub. No.: WO2018/216406
PCT Pub. Date: Nov. 29, 2018

(65) Prior Publication Data
US 2021/0171799 A1 Jun. 10, 2021

(30) Foreign Application Priority Data
May 25, 2017 (JP) .................. 2017-103481

(51) Int. Cl.
| | | |
|---|---|---|
| C09D 183/12 | (2006.01) |
| C08G 65/336 | (2006.01) |
| C08G 77/46 | (2006.01) |
| C08L 71/02 | (2006.01) |
| C08L 83/12 | (2006.01) |

(52) U.S. Cl.
CPC .......... C09D 183/12 (2013.01); C08G 65/336 (2013.01); C08G 77/46 (2013.01); C08L 71/02 (2013.01); C08L 83/12 (2013.01); C08G 2150/00 (2013.01)

(58) Field of Classification Search
CPC .................. C08G 77/46; C08G 65/336; C08G 59/02–025; C08L 71/02; C08L 83/12
See application file for complete search history.

(56) References Cited

U.S. PATENT DOCUMENTS

| | | | | |
|---|---|---|---|---|
| 4,103,913 A * | 8/1978 | McDowell | ........... | F16J 15/0818 |
| | | | | 277/592 |
| 5,331,076 A | 7/1994 | Fukuda et al. | | |
| 6,183,872 B1 | 2/2001 | Tanaka et al. | | |
| 2003/0139620 A1 | 7/2003 | Yamaguchi et al. | | |
| 2005/0090602 A1 * | 4/2005 | Koshikawa | ........... | C08G 65/336 |
| | | | | 524/544 |
| 2009/0091611 A1 | 4/2009 | Sowa et al. | | |
| 2009/0208728 A1 | 8/2009 | Itami et al. | | |
| 2009/0216035 A1 | 8/2009 | Itami et al. | | |
| 2011/0257315 A1 * | 10/2011 | Shiono | ................. | C09D 183/08 |
| | | | | 524/266 |
| 2012/0077041 A1 | 3/2012 | Yamane et al. | | |

(Continued)

FOREIGN PATENT DOCUMENTS

| | | | |
|---|---|---|---|
| JP | 5-170776 A | 7/1993 |
| JP | 2860979 B2 | 2/1999 |
| JP | 11-80315 A | 3/1999 |
| JP | 2003-238577 A | 8/2003 |
| JP | 2005-330429 A | 12/2005 |
| JP | 2008-144144 A | 6/2008 |
| JP | 2008-534696 A | 8/2008 |
| JP | 2008-537557 A | 9/2008 |
| JP | 4672095 B2 | 4/2011 |
| JP | 2012-72272 A | 4/2012 |
| JP | 2012-157856 A | 8/2012 |

(Continued)

OTHER PUBLICATIONS

Machine Translation of JPH11-080315A. Mar. 26, 1999. (Year: 1999).*
International Search Report (PCT/ISA/210) issued in PCT/JP2018/016121, dated May 22, 2018.

(Continued)

*Primary Examiner* — Stephen E Rieth
(74) *Attorney, Agent, or Firm* — Birch, Stewart, Kolasch & Birch, LLP

(57) ABSTRACT

This surface treatment agent using a compound represented by formula (1) or (2) can, even without having a hydrolyzable group, form a water repellent and oil repellent layer having excellent abrasion resistance under mild conditions such as at room temperature.

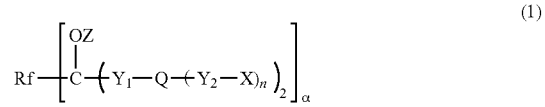

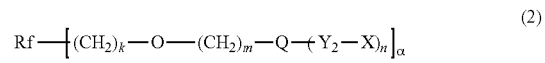

[Rf represents a monovalent or divalent fluorooxyalkylene group-containing polymer residue, $Y_1$ and $Y_2$ each represent a single bond or a divalent hydrocarbon group, Q represents a group that has a Si-containing structure having a valence of 2-4, Si, or C, X represents an epoxy-containing group, k represents 0-2, m represents 1-5, n represents 1-3, Z represents H, —$SiR_3$ (R represents an alkyl group or a phenyl group), or —$W_1$-Q'-$W_2$—X' (X' represents X or —$SiR_3$, $W_1$ and $W_2$ each represent a single bond or a divalent hydrocarbon group, Q' represents a divalent group having a Si-containing structure), and α represents 1 or 2].

9 Claims, No Drawings

(56) References Cited

U.S. PATENT DOCUMENTS

| | | | |
|---|---|---|---|
| 2013/0136928 A1 | 5/2013 | Yamane et al. | |
| 2013/0303689 A1 | 11/2013 | Sato et al. | |
| 2015/0077470 A1* | 3/2015 | Sawada | C08G 77/24 347/45 |
| 2015/0274889 A1 | 10/2015 | Sakoh et al. | |
| 2016/0319071 A1 | 11/2016 | Sakoh et al. | |

FOREIGN PATENT DOCUMENTS

| | | |
|---|---|---|
| JP | 2013-136833 A | 7/2013 |
| JP | 2013-227279 A | 11/2013 |
| JP | 2015-199906 A | 11/2015 |
| JP | 2016-150991 A | 8/2016 |
| JP | 2016-210854 A | 12/2016 |
| WO | WO 2016/101185 A1 | 6/2016 |
| WO | WO 2017/077834 A1 | 5/2017 |
| WO | WO 2017/094371 A1 | 6/2017 |

OTHER PUBLICATIONS

Written Opinion of the International Searching Authority (PCT/ISA/237) issued in PCT/JP2018/016121, dated May 22, 2018.

* cited by examiner ional group and a reactive silyl group (generally a hydrolyzable silyl group such as an alkoxysilyl group) in one molecule. The hydrolyzable silyl group forms a coating film by causing a self-condensation reaction with moisture in the air or the like. The hydrolyzable silyl group is
FLUOROPOLYETHER GROUP-CONTAINING POLYMER-MODIFIED ORGANIC SILICON COMPOUND, SURFACE TREATMENT AGENT, AND ARTICLE

TECHNICAL FIELD

The present invention relates to a fluoropolyether group-containing polymer-modified organic silicon compound, a surface treatment agent containing the organic silicon compound and an article with a surface treated by the surface treatment agent.

BACKGROUND ART

Recently, introduction of touch panels to display screens including displays of mobile phones have been increased acceleratingly. However, screens of touch panels are exposed, and thus have frequent opportunities to be in contact directly with fingers and cheeks, so that attachability of stains such as sebum has been a problem. Then, demands for a technique to make surfaces of displays less attachable with fingerprints and a technique to easily remove stains, for their better appearance and visibility, have been enhanced year by year, and the development of a material that can meet these demands has been sought. In particular, onto surfaces of touch panels, fingerprint stains are easily attached, and water repellent and oil repellent layers are desired to be provided. However, conventional water repellent and oil repellent layers have high water repellent and oil repellent properties, and have excellent stain-removability, but also have a problem that their stain-proof performances degrade during their use. Further, their functions may become changed according to their coating methods, and adhesion may become weaker according to substrates to be coated. Moreover, although there have been many surface treatment agents that have shown favorable surface characteristics with respect to glass so far, no surface treatment agent has exhibited sufficient surface characteristics such as adhesion, water repellent and oil repellent properties, abrasion resistance with respect to resin surfaces.

Generally, a fluoropolyether group-containing compound has very low surface free energy, and thus exhibits water repellent and oil repellent properties, chemical resistance, lubricity, a mold release property, a stain-proof property and the like. By utilizing these properties, they have been used widely as water repellent and oil repellent antifouling agents for paper, fibers and the like, lubricants for magnetic recording media, oil repellent agents for precision instruments, mold release agents, cosmetic materials, protective films and the like in industrial fields. However, these properties means, at the same time, non-tackiness and non-adhesiveness with respect to other substrates, so that it is possible to apply the fluoropolyether group-containing compound to a surface of a substrate, but it is difficult to adhere its coating film to the surface.

Whereas, as an agent for bonding a surface of a substrate made of glass, cloth or the like to an organic compound, a silane coupling agent has been known well, and has been widely utilized as an coating agent for surfaces of substrates in various kinds. The silane coupling agent has an organic functional group and a reactive silyl group (generally a hydrolyzable silyl group such as an alkoxysilyl group) in one molecule. The hydrolyzable silyl group forms a coating film by causing a self-condensation reaction with moisture in the air or the like. The hydrolyzable silyl group is chemically and physically bonded to a surface of glass, metal or the like, whereby this coating film becomes firm and durable.

Then, compositions, which can be easily adhered to surfaces of substrates, and can form coating films having water repellent and oil repellent properties, chemical resistance, lubricity, a mold release property, a stain-proof property and the like onto the surfaces of the substrates, by the use of fluoropolyether group-containing polymer-modified silane obtained by introducing hydrolyzable silyl groups into fluoropolyether group-containing compounds, are disclosed (Patent Documents 1 to 8: JP-A 2003-238577, JP 2860979, JP 4672095, JP-A 2008-534696, JP-A 2008-537557, JP-A 2012-072272, JP-A 2012-157856, and JP-A 2013-136833).

If treating a surface of a substrate by a composition containing the above-described fluoropolyether group-containing polymer-modified silane, various coating methods can be adopted to form a coating film to the substrate, and, in a process of hydrolyzing a hydrolyzable silyl group and curing the coating film after coating, a hydrolysis reaction is promoted in a high temperature condition at 100° C. or more and a humidified condition. Also, even at a room temperature, the reaction is caused gradually with moisture in the air so as to form a cured film. However, this curing process requires the high temperature and humidified conditions and takes a long period of time in the case of curing at a room temperature, and thus has a problem that this process itself can be rate-determining (a delay factor) in the manufacture. Further, a coating film which is cured under mild conditions such as at a room temperature in a short period of time (a water repellent and oil repellent layer) has a problem that its abrasion resistance and stain-proof performance are deteriorated during its use.

In Patent Document 9 (JP-A 2008-144144), fluorine-containing carboxylic acid is added as a curing catalyst into a coating composition so as to promote curing, whereby a film formation is performed under mild conditions in a short period of time. However, even if adding such a catalyst so as to promote the curing, abrasion resistance is still insufficient with respect to substrates made of resins, metals and the like.

PRIOR ART DOCUMENTS

Patent Documents

Patent Document 1: JP-A 2003-238577
Patent Document 2: JP 2860979
Patent Document 3: JP 4672095
Patent Document 4: JP-A 2008-534696
Patent Document 5: JP-A 2008-537557
Patent Document 6: JP-A 2012-072272
Patent Document 7: JP-A 2012-157856
Patent Document 8: JP-A 2013-136833
Patent Document 9: JP-A 2008-144144

SUMMARY OF INVENTION

Technical Problem

The present invention has been made in the light of the above-described problems, and aims to provide a fluoropolyether group-containing polymer-modified organic silicon compound which can form a water repellent and oil repellent layer with excellent abrasion resistance under mild conditions such as a room temperature even in a short period of time particularly on a surface of a resin, a surface treatment agent containing the organic silicon compound and articles with surfaces treated by the surface treatment agent.

Solution to Problem

As a result of keen study for attaining the above-described aims, the inventors of the present invention have found that a surface treatment agent using a fluoropolyether group-containing polymer-modified organic silicon compound represented by a below-described general formula (1) or (2), which is even free of hydrolyzable group, can form a water repellent and oil repellent layer with excellent abrasion resistance under mild conditions such as at a room temperature, thereby having completed the present invention.

Accordingly, the present invention provides a fluoropolyether group-containing polymer-modified organic silicon compound, a surface treatment agent and articles described below.

[1]

A fluoropolyether group-containing polymer-modified organic silicon compound represented by a following general formula (1) or (2):

[Chem. 1]

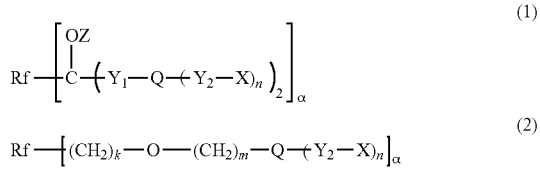

[in the formulae, Rf is a monovalent or divalent fluorooxyalkylene group-containing polymer residue, each of $Y_1$ and $Y_2$ is independently a single bond or a divalent hydrocarbon group, Q is independently a divalent to tetravalent straight-chain, branched-chain or cyclic organosiloxane residue, silalkylene structure or silarylene structure, a diorganosilylene group, a monoorganosilylene group, a silicon atom, a carbon atom, a combination of them or a combination of them with an alkylene group, X is independently a glycidoxy group, a glycidoxyalkyl group, an alicyclic epoxy group or an alicyclic epoxy-containing alkyl group, k is an integer ranging from 0 to 2, m is an integer ranging from 1 to 5, n is an integer ranging from 1 to 3, Z is independently a hydrogen atom, a triorganosilyl group represented by a following formula:

—SiR$_3$ (in the formula, each R is independently a $C_{1-4}$ alkyl group or phenyl group) or a group represented by a following formula:

—W$_1$-Q'-W$_2$—X'

(in the formula, X' is X or —SiR$_3$ (R is the same as above), each of $W_1$ and $W_2$ is independently a single bond or a divalent hydrocarbon group, Q' is a divalent group having a structure selected from a diorganosilylene group, an organosiloxane residue, a silalkylene structure, a silarylene structure and combinations of them, and α is 1 or 2.)]

[2]

The fluoropolyether group-containing polymer-modified organic silicon compound according to [1], wherein, in the formula (1) or (2), α is 1, and Rf is a monovalent fluorooxyalkylene group-containing polymer residue represented by a following general formula (3):

[Chem. 2]

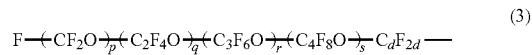

(in the formula, each of p, q, r and s is independently an integer ranging from 0 to 200, p+q+r+s is an integer ranging from 3 to 200, each of the repeating units may be a straight chain or a branched chain, the respective repeating units may be bonded to each other at random, d is an integer ranging from 1 to 3, and the unit (—$C_dF_{2d}$—) may be a straight chain or a branched chain.)

[3]

The fluoropolyether group-containing polymer-modified organic silicon compound according to [1], wherein, in the formula (1) or (2), α is 2, and Rf is a divalent fluorooxyalkylene group-containing polymer residue represented by a following general formula (4):

[Chem. 3]

(in the formula, each of p, q, r and s is independently an integer ranging from 0 to 200, p+q+r+s is an integer ranging from 3 to 200, each of the repeating units may be a straight chain or a branched chain, the respective repeating units may be bonded to each other at random, d is an integer ranging from 1 to 3, and each of the units (—$C_dF_{2d}$—) may be independently a straight chain or a branched chain.)

[4]

The fluoropolyether group-containing polymer-modified organic silicon compound according to any one of [1] to [3], wherein, in the formula (1) or (2), each of $Y_1$ and $Y_2$ is independently a $C_{2-10}$ alkylene group.

[5]

The fluoropolyether group-containing polymer-modified organic silicon compound according to any one of [1] to [4], wherein, in the formula (1) or (2), Q is a group selected from groups represented by following formulae:

[Chem. 4]

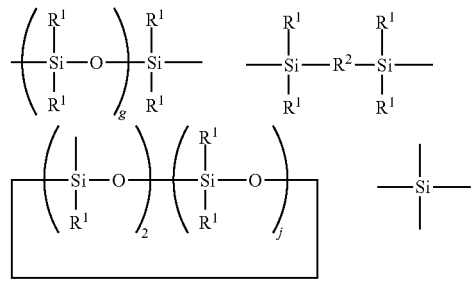

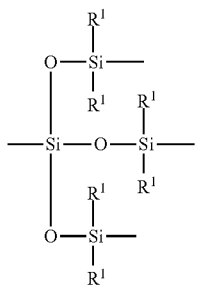

(in the formulae, $R^1$ is independently a $C_{1-4}$ alkyl group or a phenyl group, $R^2$ is a $C_{1-4}$ alkylene group or a $C_{6-12}$ arylene group, $R^3$ is a hydrogen atom or $R^1$, g is an integer ranging from 1 to 20, and j is an integer ranging from 1 to 8.)

[6]
The fluoropolyether group-containing polymer-modified organic silicon compound according to any one of [1] to [5], wherein, in the formula (1), Z is at least one kind selected from a hydrogen atom and below-described groups:

[Chem. 5]
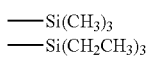
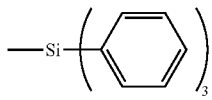
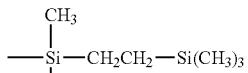
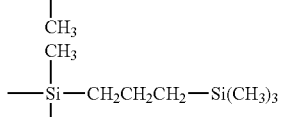

[Chem. 6]
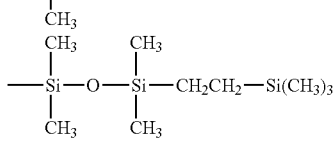

[Chem. 7]
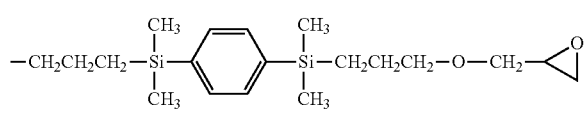

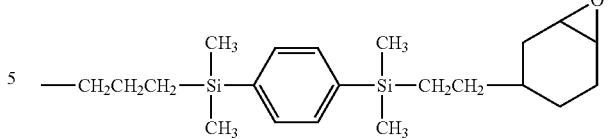

[Chem. 8]
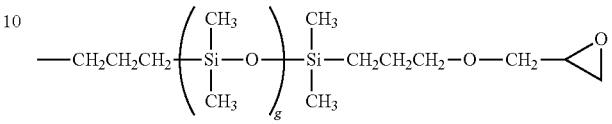

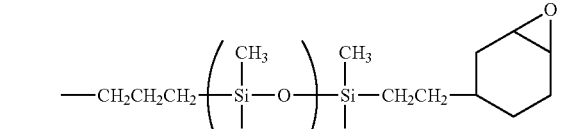

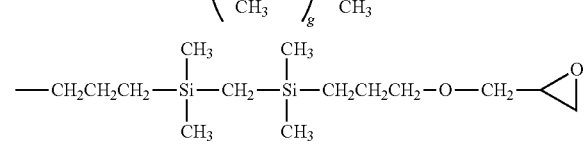

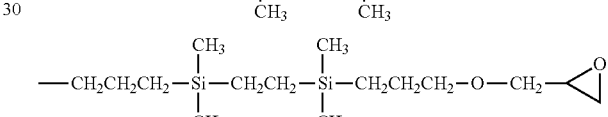

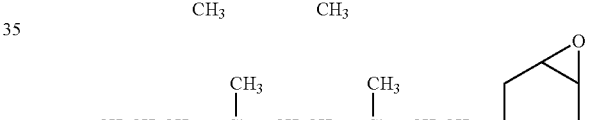

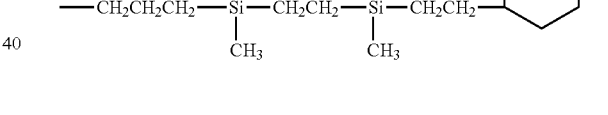

(in the formulae, g is an integer ranging from 1 to 20.)

[7]
The fluoropolyether group-containing polymer-modified organic silicon compound according to any one of [1] to [6], wherein the fluoropolyether group-containing polymer-modified organic silicon compound represented by the formula (1) or (2) is represented by any of following formulae:

[Chem. 9]
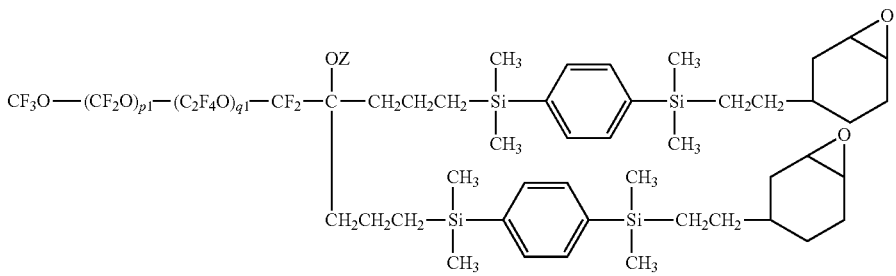

-continued
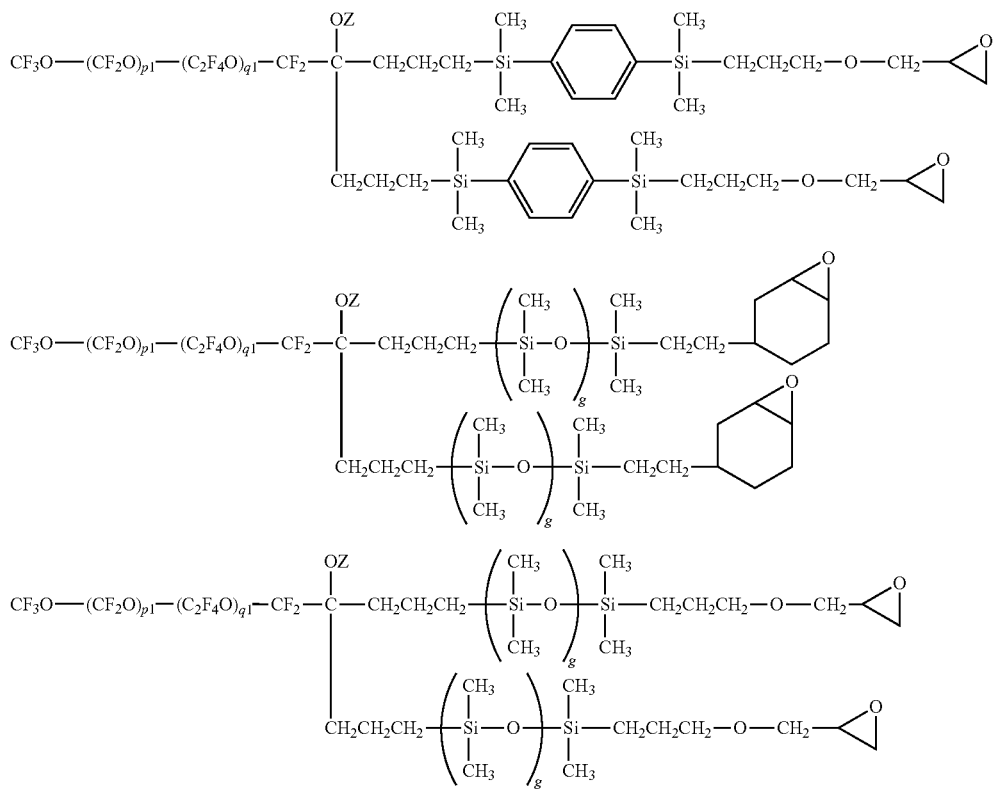
[Chem. 10]
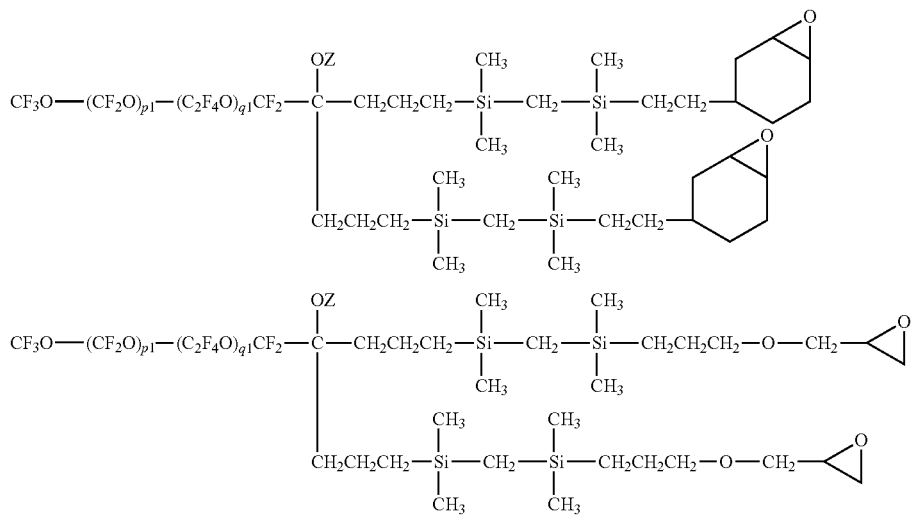
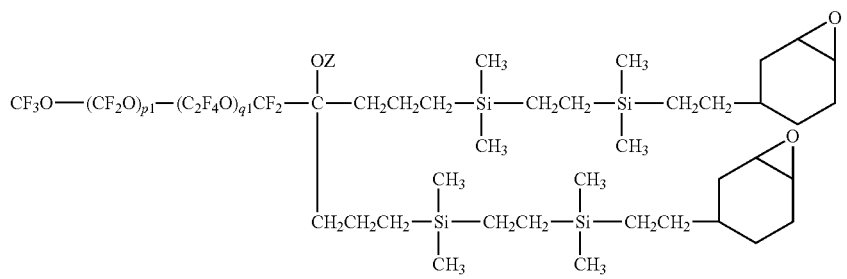

-continued
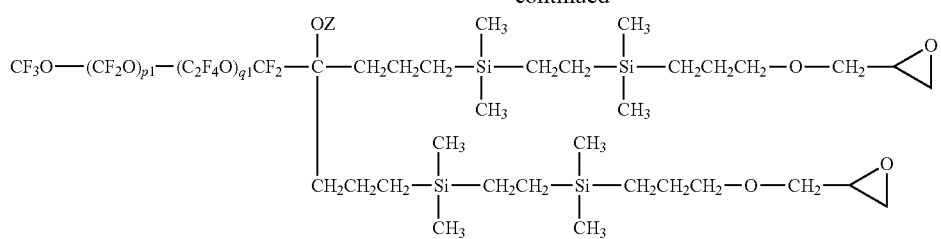
[Chem. 11]
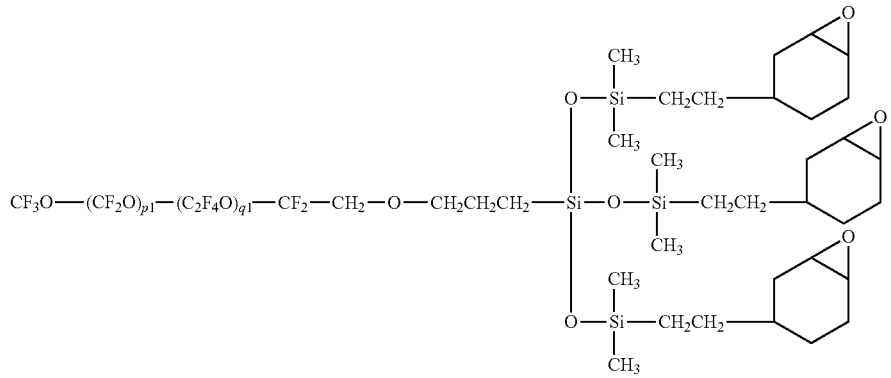
[Chem. 12]
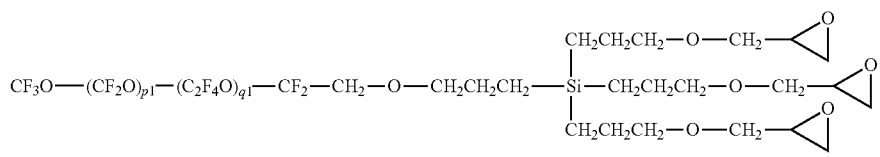
[Chem. 13]
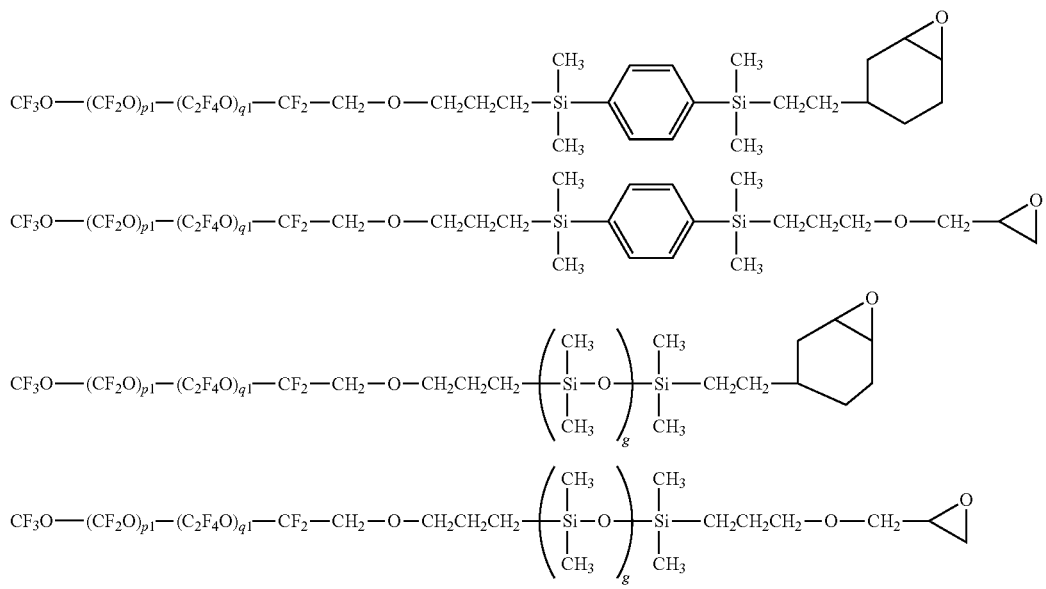
[Chem. 14]
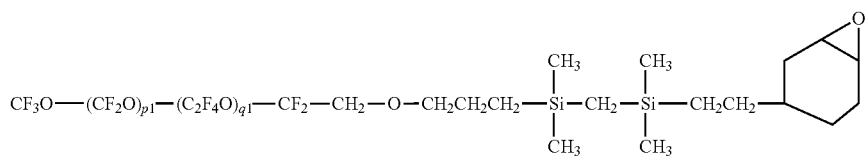

-continued
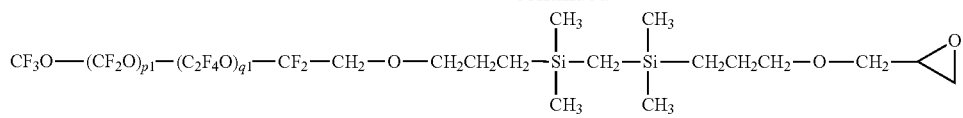
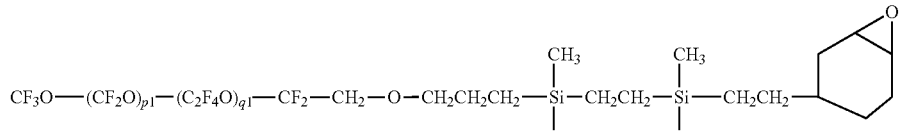
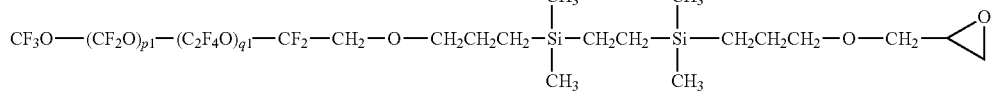
[Chem. 15]
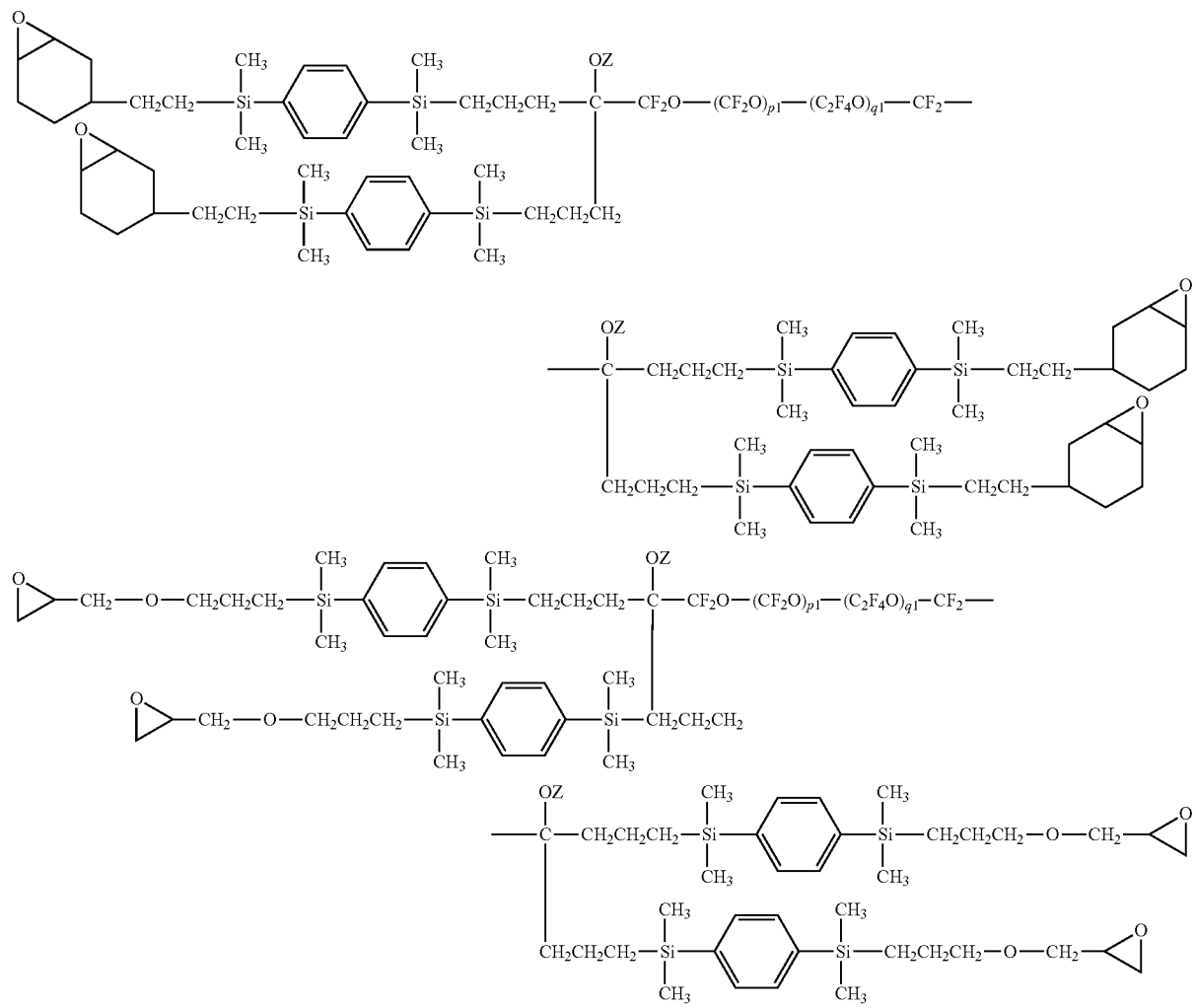
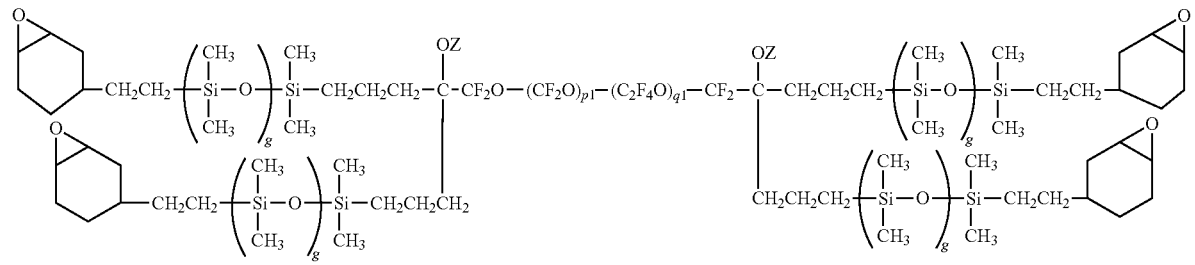

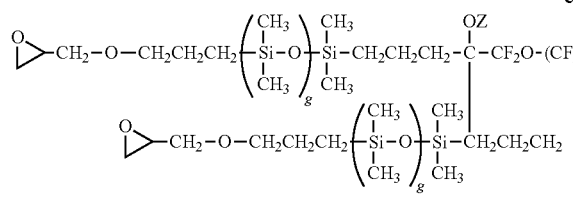
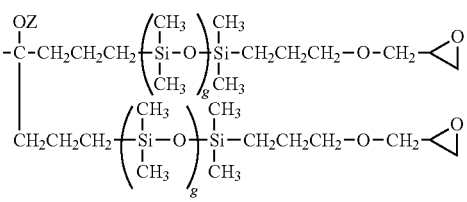
[Chem. 16]
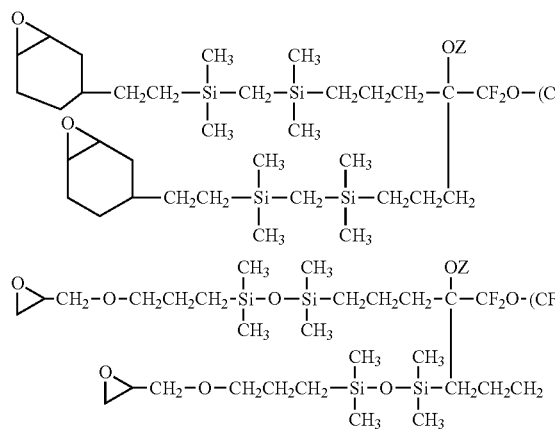
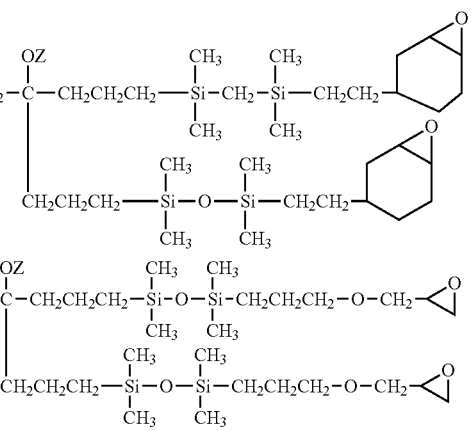
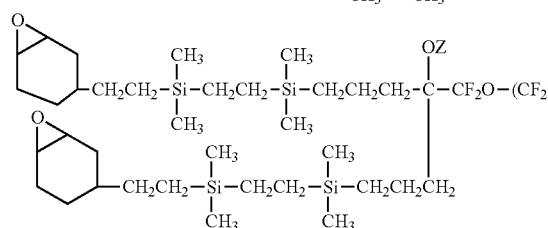
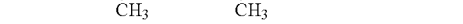
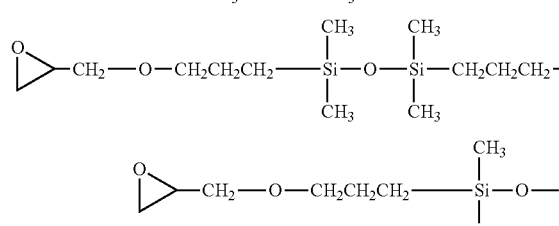
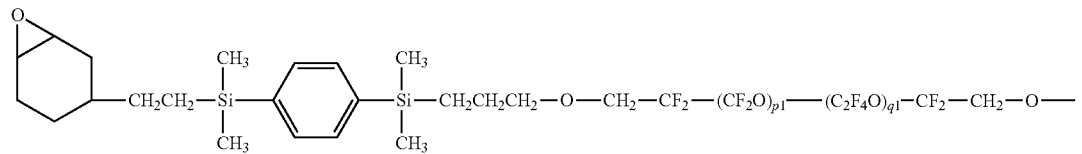
[Chem. 17]
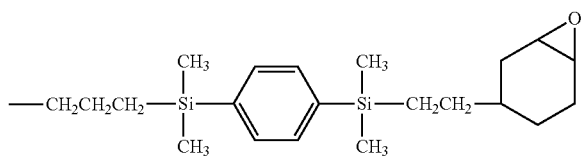

-continued
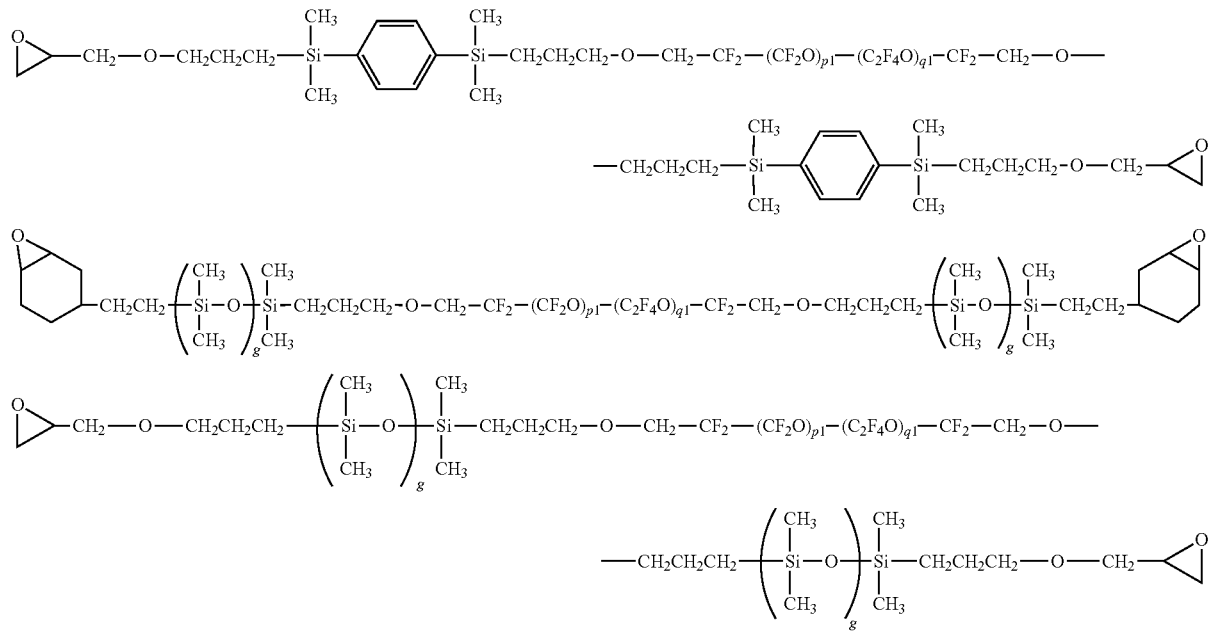
[Chem. 18]
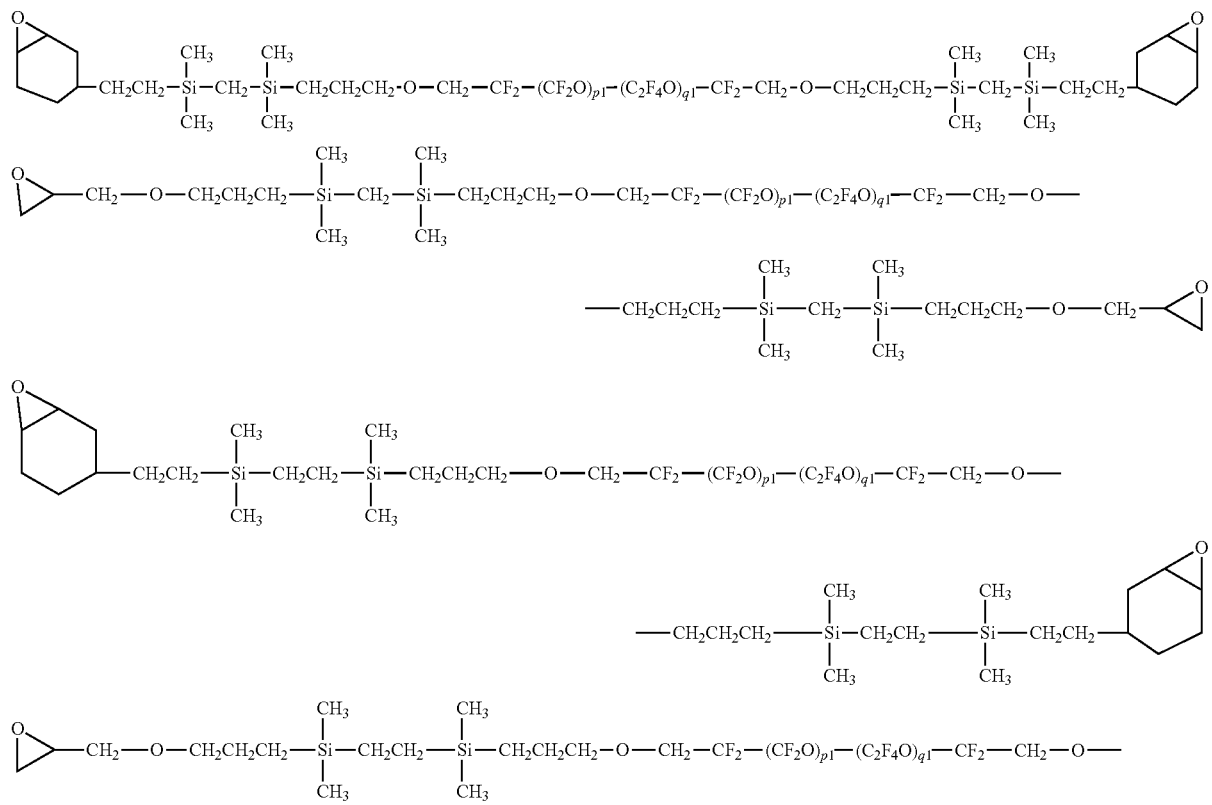
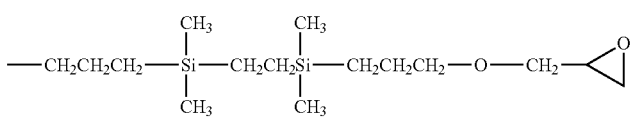

(in the formulae, Z is the same as above, p1 is an integer ranging from 5 to 100, q1 is an integer ranging from 5 to 100, p1+q1 is an integer ranging from 10 to 105, and the respective repeating units may be bonded at random, and g is an integer ranging from 1 to 20.)

[8]

A surface treatment agent including the fluoropolyether group-containing polymer-modified organic silicon compound according to any one of [1] to [7].

[9]

The surface treatment agent according to [8] further including a fluoropolyether group-containing polymer represented by a following general formula (5):

[Chem. 19]

A-Rf-A    (5)

(in the formula, A is a fluorine atom or a monovalent fluorine-containing group having $-CF_3$ group at a terminal, and Rf is a divalent fluorooxyalkylene group-containing polymer residue.)

[10]

An article including a cured film of the surface treatment agent according to [9] on a surface.

Advantageous Effects of Invention

A coating film made of the surface treatment agent containing the fluoropolyether group-containing polymer-modified organic silicon compound of the present invention has high water repellent and oil repellent properties, and in particular, a coating film formed under mild conditions such as at a room temperature in a short period of time has excellent abrasion resistance. By treating by the surface treatment agent which contains the fluoropolyether group-containing polymer-modified organic silicon compound of the present invention, excellent water repellent and oil repellent properties, low dynamic frictionality and abrasion resistance can be added easily to various kinds of articles in a short period of time.

DESCRIPTION OF EMBODIMENTS

The fluoropolyether group-containing polymer-modified organic silicon compound of the present invention is a compound represented by a following general formula (1) or (2):

[Chem. 20]

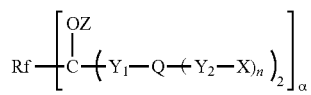

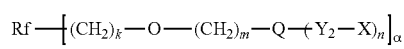

[in the formulae, Rf is a monovalent or divalent fluorooxyalkylene group-containing polymer residue, each of $Y_1$ and $Y_2$ is independently a single bond or a divalent hydrocarbon group, Q is independently a divalent to tetravalent straight-chain, branched-chain or cyclic organosiloxane residue, silalkylene structure or silarylene structure, a diorganosilylene group, a monoorganosilylene group, a silicon atom, a carbon atom, a combination of them or a combination of them with an alkylene group, X is independently a glycidoxy group, a glycidoxyalkyl group, an alicyclic epoxy group or an alicyclic epoxy-containing alkyl group, k is an integer ranging from 0 to 2, m is an integer ranging from 1 to 5, n is an integer ranging from 1 to 3, Z is independently a hydrogen atom, a triorganosilyl group represented by a following formula:

(in the formula, each R is independently a $C_{1-4}$ alkyl group or phenyl group) or a group represented by a following formula:

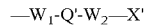

(in the formula, X' is X or $-SiR_3$ (R is the same as above), each of $W_1$ and $W_2$ is independently a single bond or a divalent hydrocarbon group, Q' is a divalent group having a structure selected from a diorganosilylene group, an organosiloxane residue, a silalkylene structure, a silarylene structure and combinations of them, and α is 1 or 2.)]

In the formula (1) or (2), if α is 1, Rf is preferably a monovalent fluoroxyalkyl group (that is, a monovalent fluorooxyalkylene group-containing polymer residue) represented by a following general formula (3):

[Chem. 21]

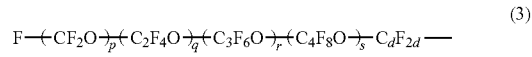

(in the formula, each of p, q, r and s is independently an integer ranging from 0 to 200, p+q+r+s is an integer ranging from 3 to 200, each of the repeating units may be a straight chain or a branched chain, the respective repeating units may be bonded to each other at random, d is an integer ranging from 1 to 3, and the unit ($-C_dF_{2d}-$) may be a straight chain or a branched chain.)

In the formula (1) or (2), if α is 2, and Rf is preferably a divalent fluorooxyalkylene group (that is, a divalent fluorooxyalkylene group-containing polymer residue) represented by a following general formula (4):

[Chem. 22]

(in the formula, each of p, q, r and s is independently an integer ranging from 0 to 200, p+q+r+s is an integer ranging from 3 to 200, each of the repeating units may be a straight chain or a branched chain, the respective repeating units may be bonded to each other at random, d is an integer ranging from 1 to 3, and each of the units ($-C_dF_{2d}-$) may be independently a straight chain or a branched chain.)

In above-described Formulae (3) and (4), each of p, q, r and s is an integer ranging from 0 to 200, it is preferable that p is an integer ranging from 5 to 100, q is an integer ranging from 5 to 100, r is an integer ranging from 0 to 100, and s is an integer ranging from 0 to 100, p+q+r+s is an integer ranging from 3 to 200, is preferably an integer ranging from 10 to 105, and is more preferably an integer ranging from 10 to 100, each of the repeating units may be a straight chain or a branched chain, and the respective repeating units may be bonded to each other at random. More preferably, p+q is an integer ranging from 10 to 105, and is particularly an integer ranging from 15 to 60, and r=s=0. It is preferable if p+q+r+s is lower than the above-described upper limit value, because adhesion and a coating film forming property become favorable, and it is preferable if p+q+r+s is higher than the above-described lower limit value, because characteristics of the fluoropolyether group can be exhibited sufficiently.

In above Formulae (3) and (4), d is an integer ranging from 1 to 3, and is preferably 1 or 2, and the unit ($-C_dF_{2d}-$) may be a straight chain or a branched chain.

By having a main chain structure represented by above-described formula (3) or (4) as Rf, a coating film with a low dynamic friction coefficient can be formed.

Further, a straight-chain polymer, which has a fluoropolyether structure (a monovalent fluorooxyalkylene group-containing polymer residue) as a main chain, and has an epoxy group at one terminal of a molecular chain, in which they are connected via a siloxane bond, a silphenylene bond or a silalkylene bond (a fluoropolyether group-containing polymer-modified organic silicon compound, wherein α is 1, and Rf is a monovalent fluoroxyalkyl group (a monovalent fluorooxyalkylene group-containing polymer residue) represented by formula (3)) can add higher abrasion resistance to a coating film to be obtained than a straight-chain polymer, which has a fluoropolyether structure (a divalent fluorooxyalkylene group-containing polymer residue) as a main chain, and has epoxy groups at both terminals of a molecular chain, in which they are connected by a siloxane bond, a silphenylene bond or a silalkylene bond (a fluoropolyether group-containing polymer-modified organic silicon compound, wherein α is 2, and Rf is a divalent fluoroxyalkyl group (a divalent fluorooxyalkylene group-containing polymer residue) represented by formula (4)).

As Rf, following groups can be exemplified specifically.

[Chem. 23]

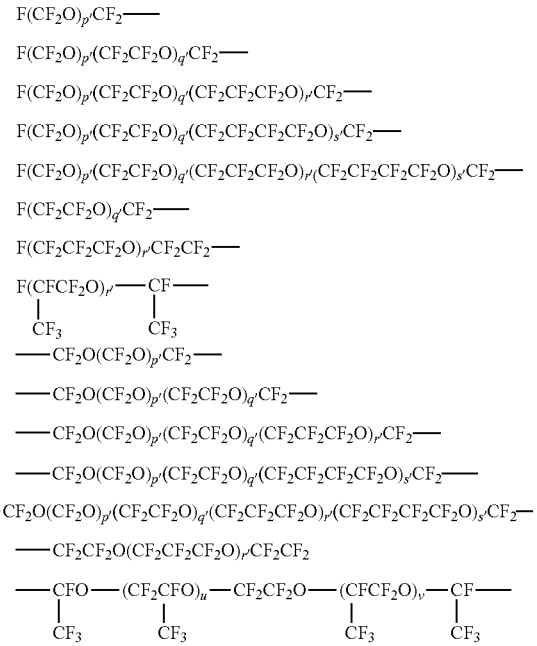

(In the formulae, p', q', r' and s' are respectively integers of 1 or more, and their upper limits are equal to the upper limits of p, q, r and s described above, u is an integer ranging from 1 to 24, and v is an integer ranging from 1 to 24. Each of the repeating units may be bonded at random.)

In above-described Formulae (1) and (2), each of $Y_1$ and $Y_2$ is independently a single bond or a divalent hydrocarbon group, and is preferably a $C_{2-10}$, in particular, $C_{2-8}$ alkylene group such as an ethylene group, a propylene group (a trimethylene group, a methylethylene group), a butylene group (a tetramethylene group, a methylpropylene group), a hexamethylene group and an octamethylene group, and is particularly preferably an ethylene group and a trimethylene group.

In above-described Formulae (1) and (2), X is a glycidoxy group, a glycidoxyalkyl group, an alicyclic epoxy group or an alicyclic epoxy-containing alkyl group (for example, a glycidoxy group, a 3,4-epoxycyclohexyl group, a 2,3-epoxycyclohexyl group, a γ-glycidoxypropyl group, a 3,4-epoxycyclohexylethyl group, a 2,3-epoxycyclohexylethyl group or the like).

In above-described Formulae (1) and (2), Q is independently a divalent to tetravalent straight-chain, branched-chain or cyclic organosiloxane residue, silalkylene structure or silarylene structure, a diorganosilylene group, a monoorganosilylene group, a silicon atom, a carbon atom, a combination of them or a combination of them with an alkylene group.

Herein, as the straight-chain, branched-chain or cyclic organosiloxane residue, silalkylene structure or silarylene structure, following structures can be exemplified.

[Chem. 24]

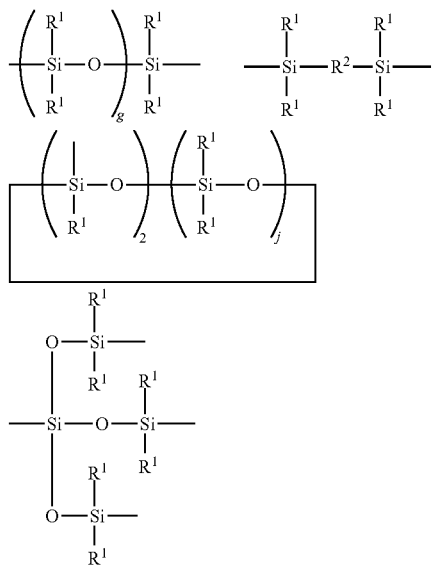

(In the formulae, $R^1$ is independently a $C_{1-4}$ alkyl group such as a methyl group, an ethyl group, a propyl group and a butyl group or a phenyl group, $R^2$ is a $C_{1-4}$ alkylene group such as a methylene group, an ethylene group, a propylene group and a butylene group or a $C_{6-12}$ arylene group such as a phenylene group, $R^3$ is a hydrogen atom or $R^1$, g is an integer ranging from 1 to 20, is preferably an integer ranging from 1 to 10, and is more preferably an integer ranging from 2 to 10, and j is an integer ranging from 1 to 8, and is preferably an integer ranging from 1 to 3.)

As Q, beside the above-described divalent to tetravalent straight-chain, branched-chain and cyclic organosiloxane residue, silalkylene structure and silarylene structure, the diorganosilylene group, the monoorganosilylene group, the silicon atom and the carbon atom, as the combination of them or the combination of them with an alkylene group, a divalent group obtained by bonding alkylene groups to each other via a silalkylene structure or a silarylene structure, a divalent to tetravalent group obtained by bonding an alkylene group to a join hand of a divalent to tetravalent straight-chain, branched-chain or cyclic organosiloxane residue having two to forty silicon atoms, and preferably two to ten silicon atoms, and the like can be exemplified specifically. As the combinations of them, the divalent group obtained by bonding alkylene groups to each other via a silalkylene structure or a silarylene structure, the divalent to tetravalent group obtained by bonding an alkylene group to a join hand of a divalent to tetravalent straight-chain or branched-chain organosiloxane residue having two to ten silicon atoms, and the like can be exemplified preferably.

As specific examples of Q, following groups can be exemplified.

[Chem. 25]

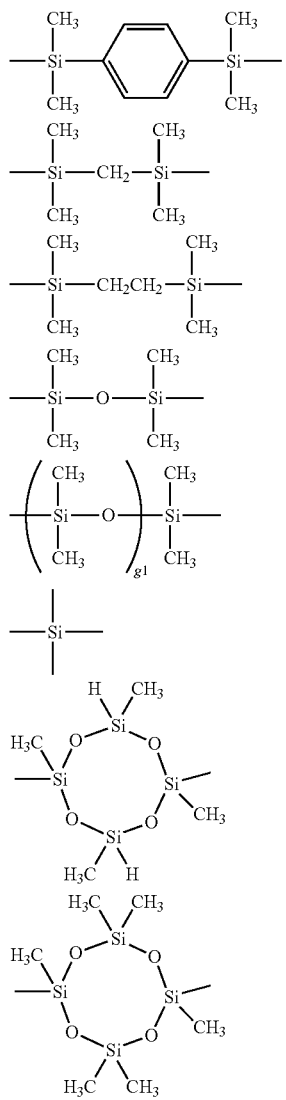

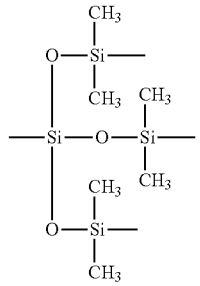

(In the formulae, g1 is an integer ranging from 2 to 20, and is preferably an integer ranging from 2 to 10.)

In above-described formula (1), Z is independently a hydrogen atom, a triorganosilyl group represented by a following formula:

—SiR$_3$ (in the formula, each R is independently a $C_{1-4}$ alkyl group or a phenyl group), or a group represented by a following formula:

—W$_1$-Q'-W$_2$—X'

(in the formula, X' is the same as above-described X, or is SiR$_3$ (R is the same as above), each of W$_1$ and W$_2$ is independently a single bond or a divalent hydrocarbon group, and Q' is a divalent group having a structure selected from a diorganosilylene group, an organosiloxane residue (provided that a terminal of the residue may be a silicon atom or an oxygen atom), a silalkylene structure, a silarylene structure and combinations of them.)

In —SiR$_3$, R is a $C_{1-4}$ alkyl group such as a methyl group, an ethyl group, a propyl group and a butyl group or a phenyl group, and among them, a methyl group and an ethyl group are favorable.

Further, in —W$_1$-Q'-W$_2$—X', each of W$_1$ and W$_2$ is independently a single bond or a divalent hydrocarbon group, and as the divalent hydrocarbon group, $C_{2-10}$, particularly $C_{2-8}$ alkylene groups such as an ethylene group, a propylene group (a trimethylene group, a methylethylene group) and a butylene group (a tetramethylene group, a methylpropylene group), a hexamethylene group and an octamethylene group can be exemplified, and each of W$_1$ and W$_2$ is preferably a single bond, an ethylene group or a trimethylene group.

X' is the same as above-described X (that is, a glycidoxy group, a glycidoxyalkyl group, an alicyclic epoxy group or an alicyclic epoxy group-containing alkyl group), or is the same as —SiR$_3$ (R is the same as above), and is preferably a circular or alicyclic epoxy group (for example, a glycidoxy group, a 3,4-epoxycyclohexyl group, a 2,3-epoxycyclohexyl group, a γ-glycidoxypropyl group, a 3,4-epoxycyclohexylethyl group, a 2,3-epoxycyclohexylethyl group or the like).

Moreover, Q' is a divalent group having a structure selected from a diorganosilylene group, an organosiloxane residue (provided that a terminal of the residue may be a silicon atom or an oxygen atom), a silalkylene structure, a silarylene structure and combinations of them, and preferably has the divalent straight-chain or cyclic organosiloxane residue, silalkylene structure or silarylene structure, which are exemplified above as Q.

As specific examples of Q', following groups can be exemplified.

[Chem. 26]

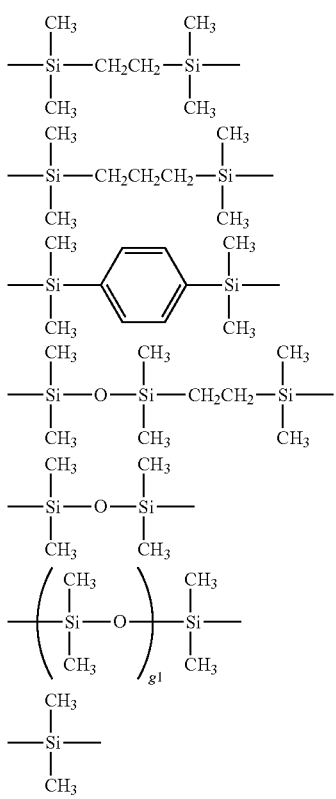

(In the formulae, g1 is the same as above.)

As Z, a hydrogen atom and following groups can be exemplified specifically.

[Chem. 27]

[Chem. 28]

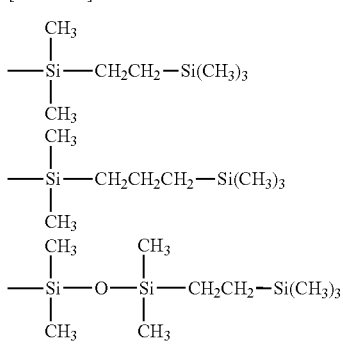

[Chem. 29]

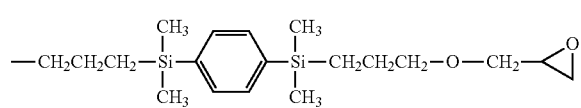

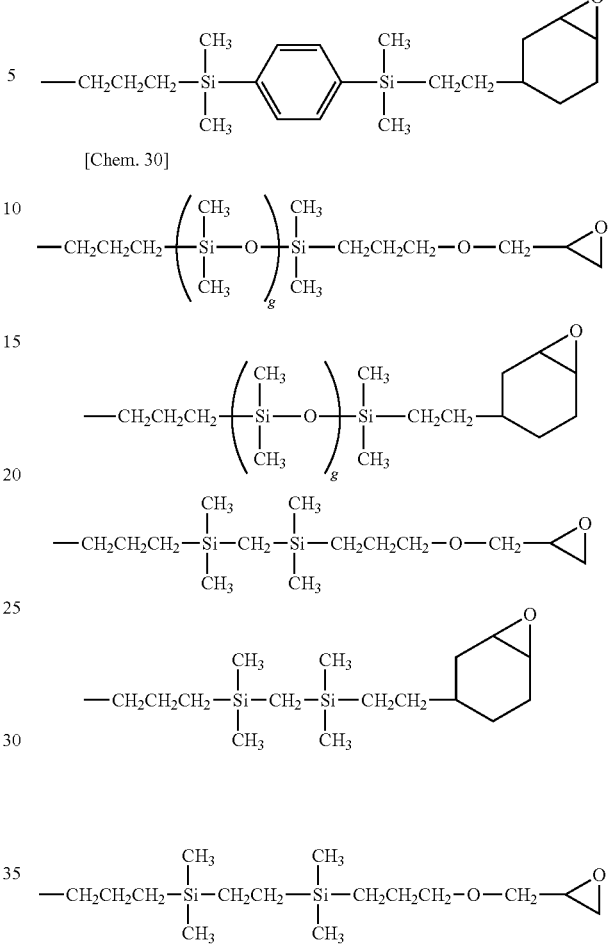

[Chem. 30]

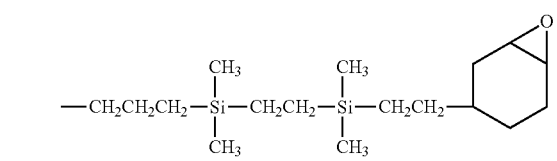

(In the formulae, g is the same as above.)

In above-described formula (1) or (2), α is 1 or 2, and n is an integer ranging from 1 to 3, and is preferably 1 or 2.

Further, in above-described formula (2), k is an integer ranging from 0 to 2, and is preferably 1 or 2, and m is an integer ranging from 1 to 5, and is preferably 2 or 3.

As the fluoropolyether group-containing polymer-modified organic silicon compound represented by above-described formula (1) or (2), compounds represented by following formulae can be exemplified. Incidentally, in each of the formulae, the number of repeat (or a polymerization degree) of each repeating unit that composes a fluoroxyalkyl group (a monovalent fluorooxyalkylene group-containing polymer residue) or a fluoroxyalkylene group (a divalent fluorooxyalkylene group-containing polymer residue), represented by Rf can be an arbitrary number that satisfies above-described Formulae (3) and (4).

[Chem. 31]
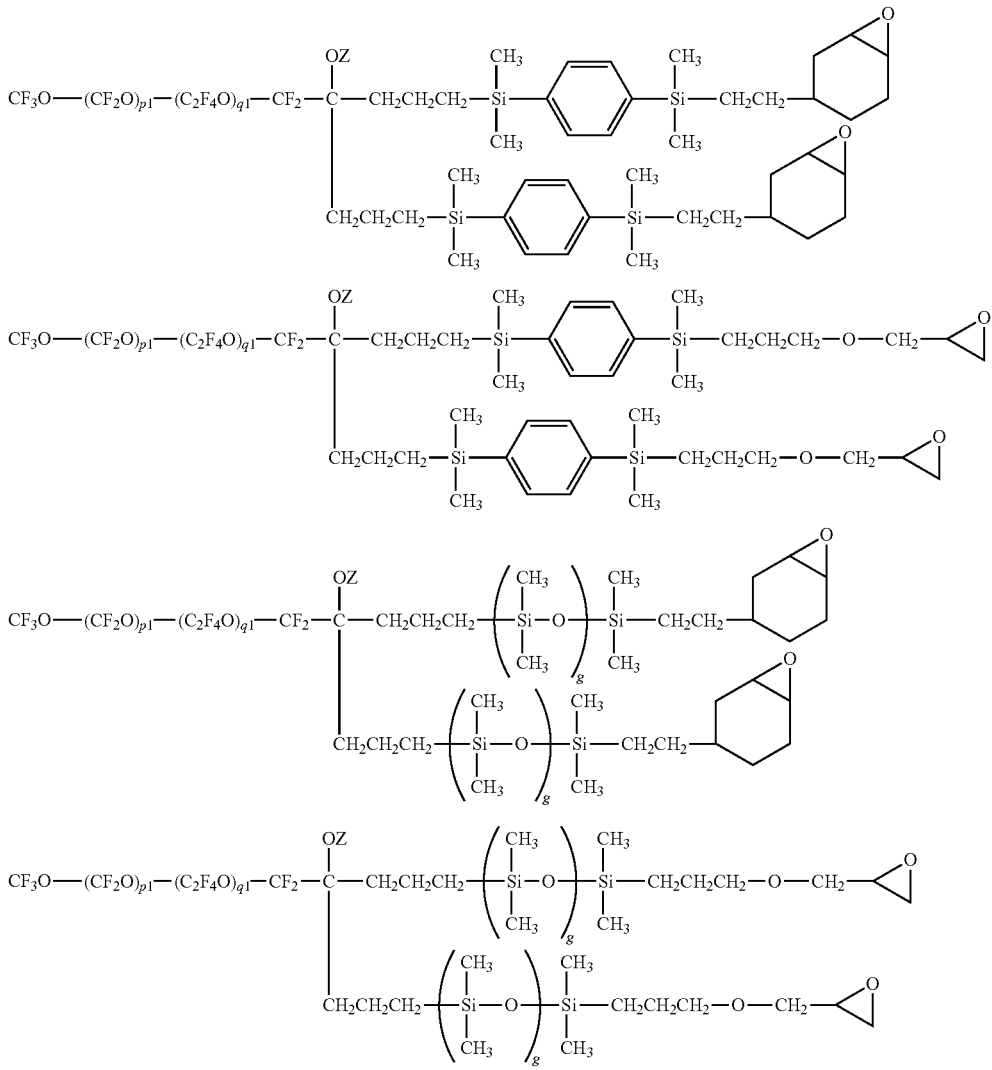
[Chem. 32]
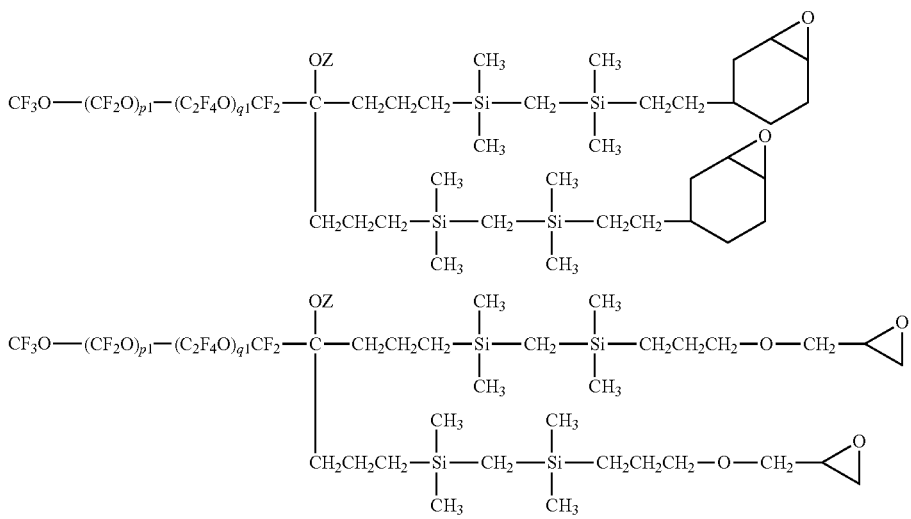

-continued
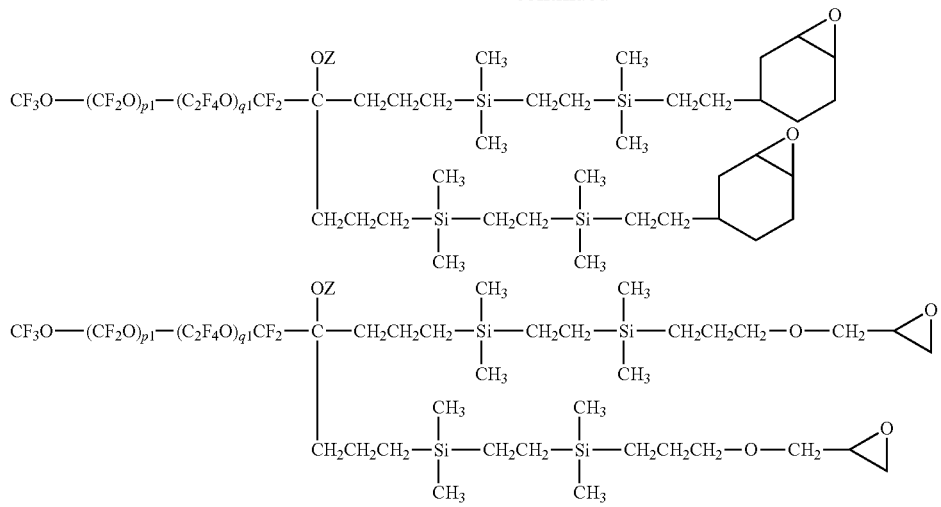
[Chem. 33]
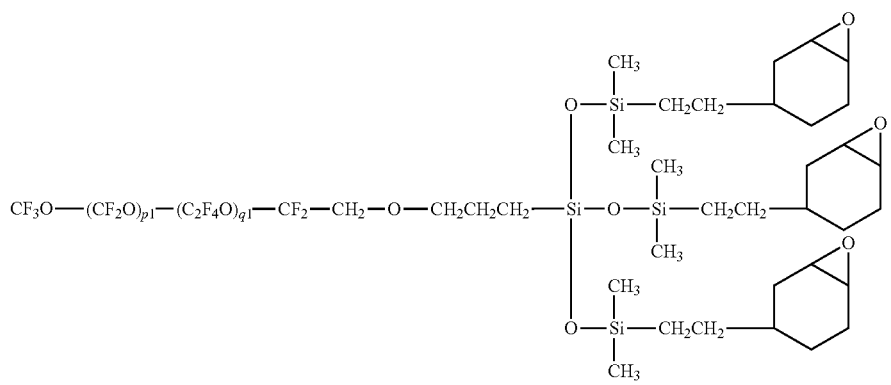
[Chem. 34]
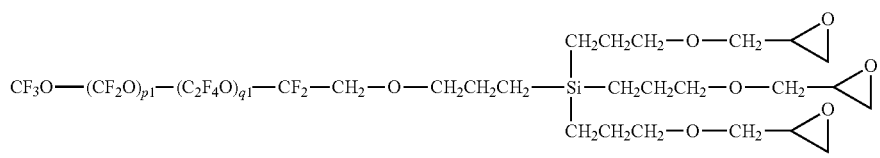
[Chem. 35]
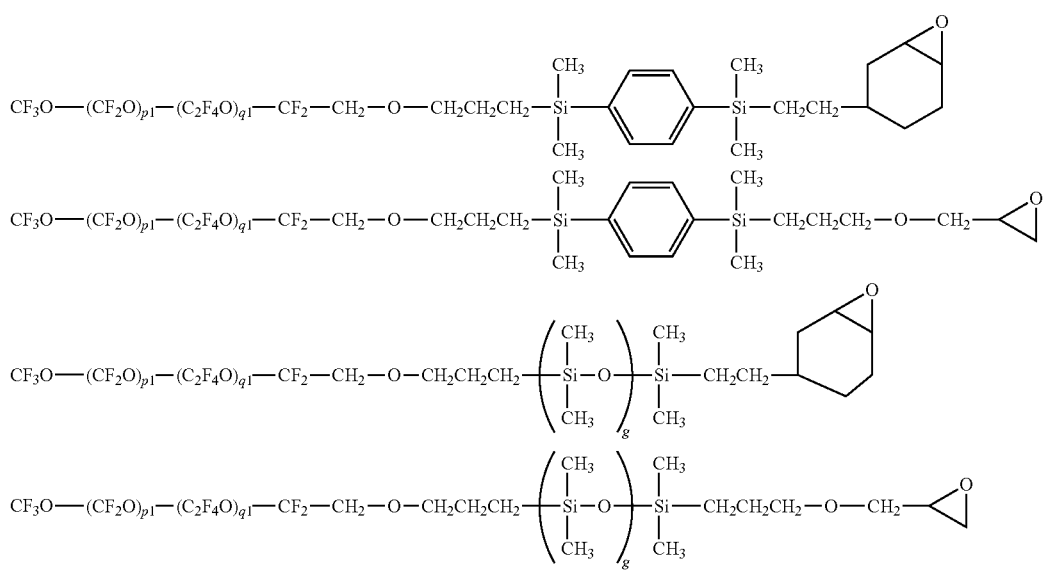

[Chem. 36]
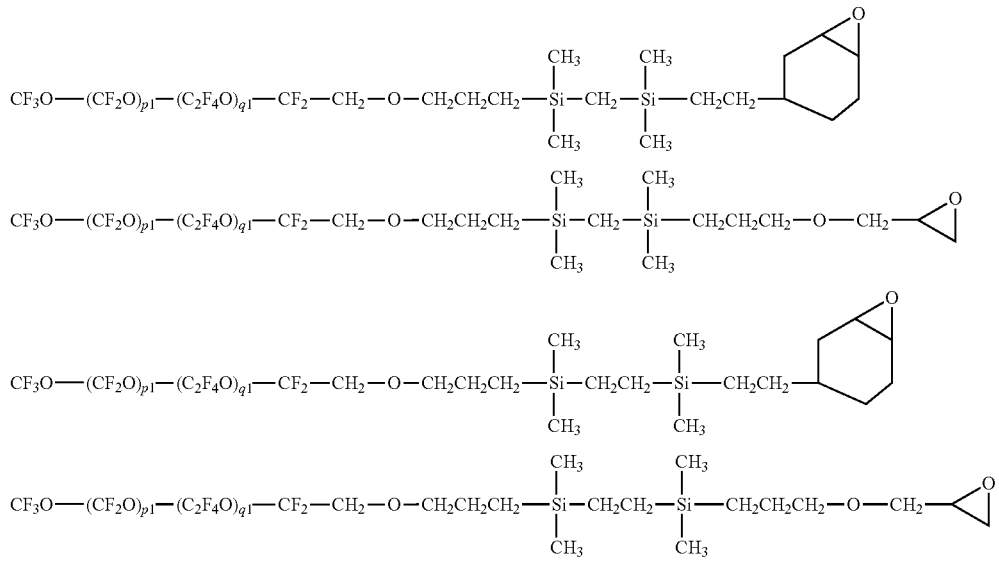
[Chem. 37]
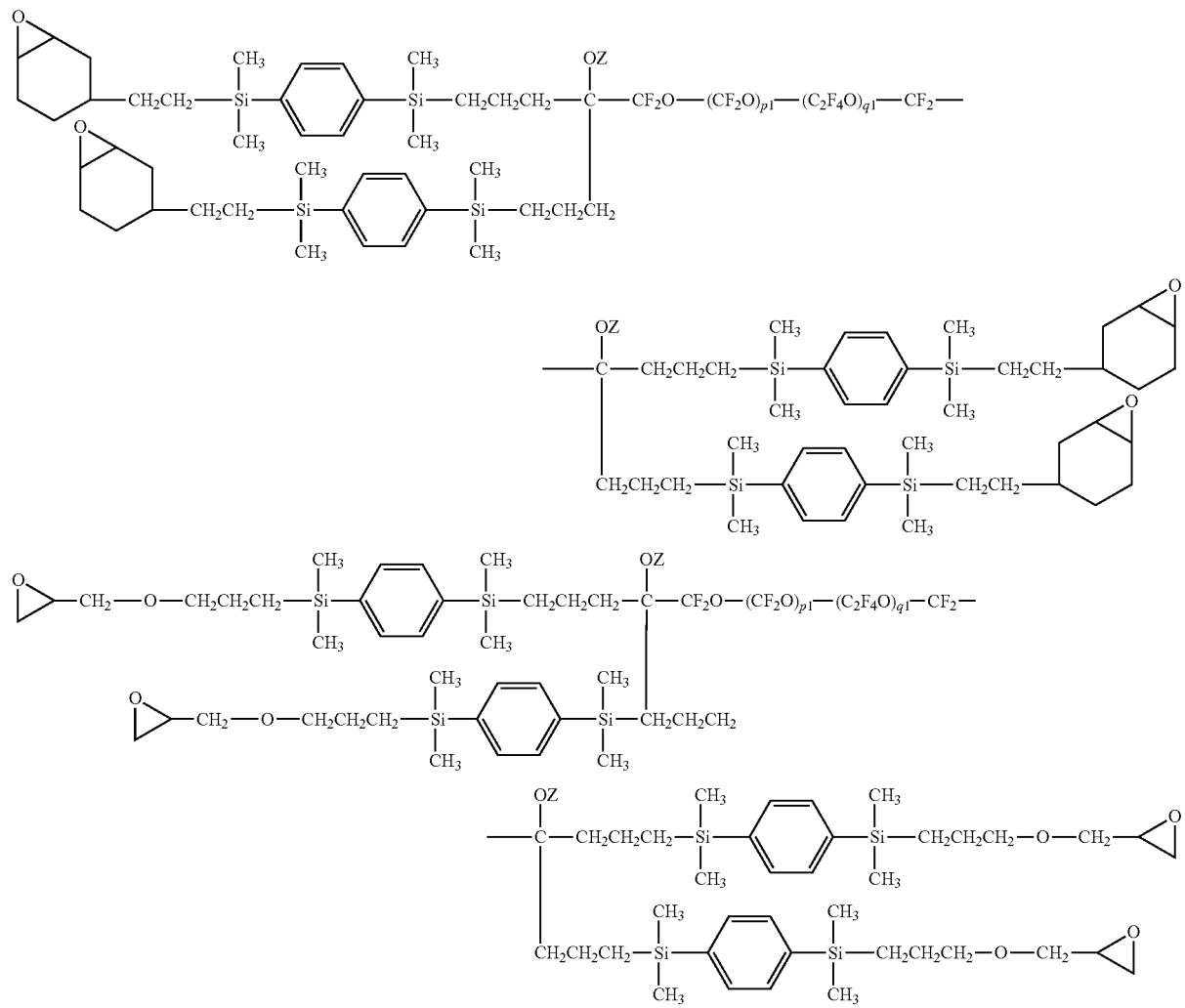

-continued
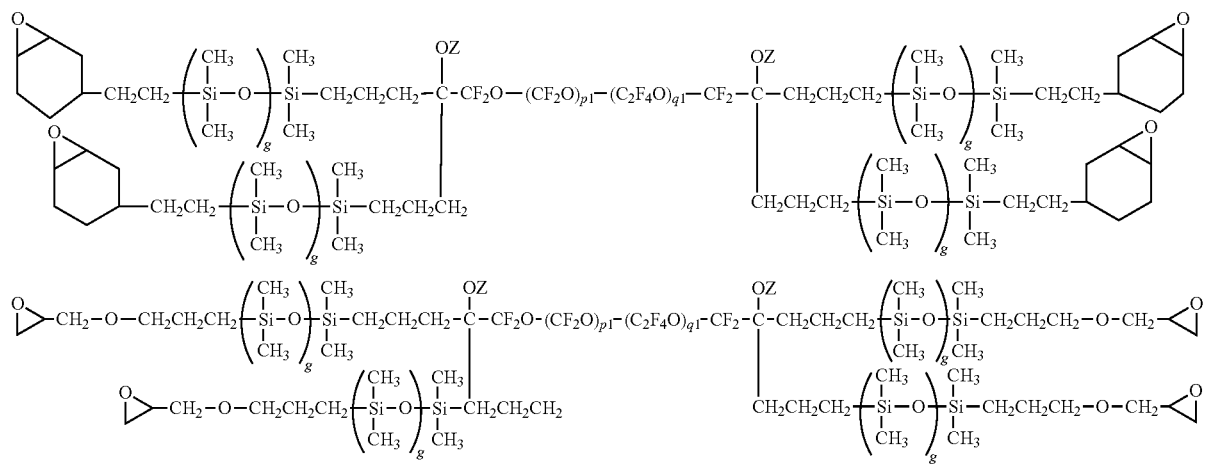
[Chem. 38]
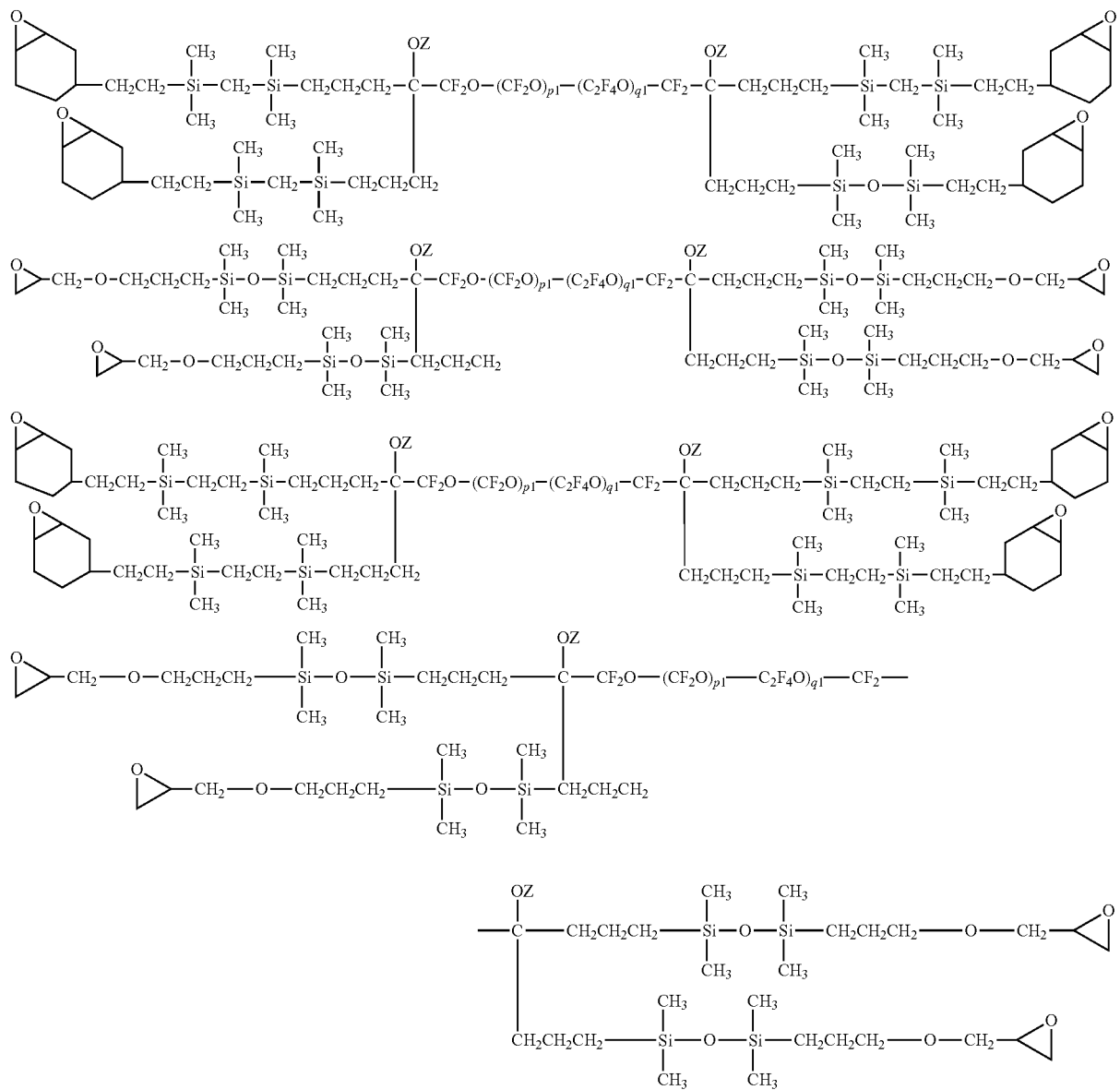

[Chem. 39]
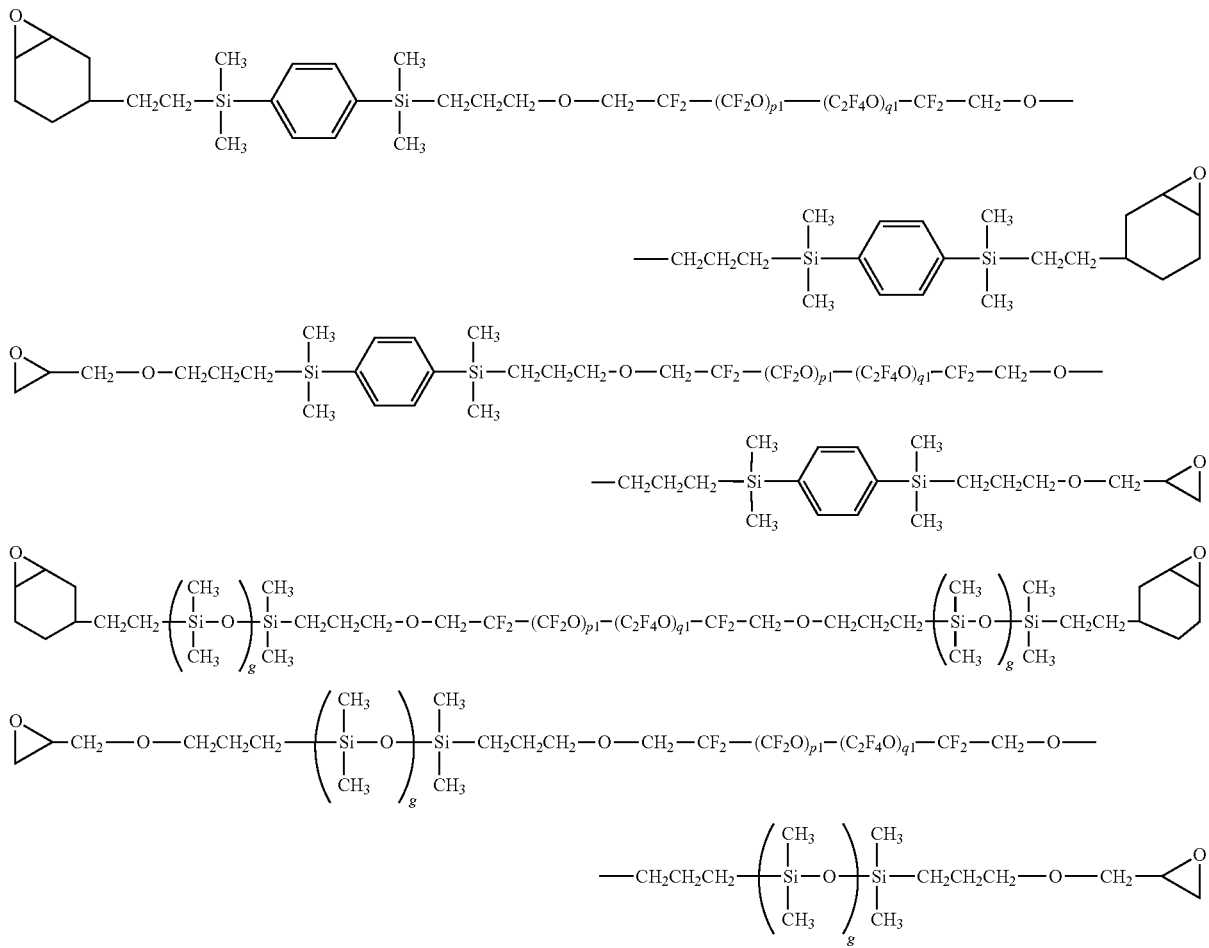
[Chem. 40]
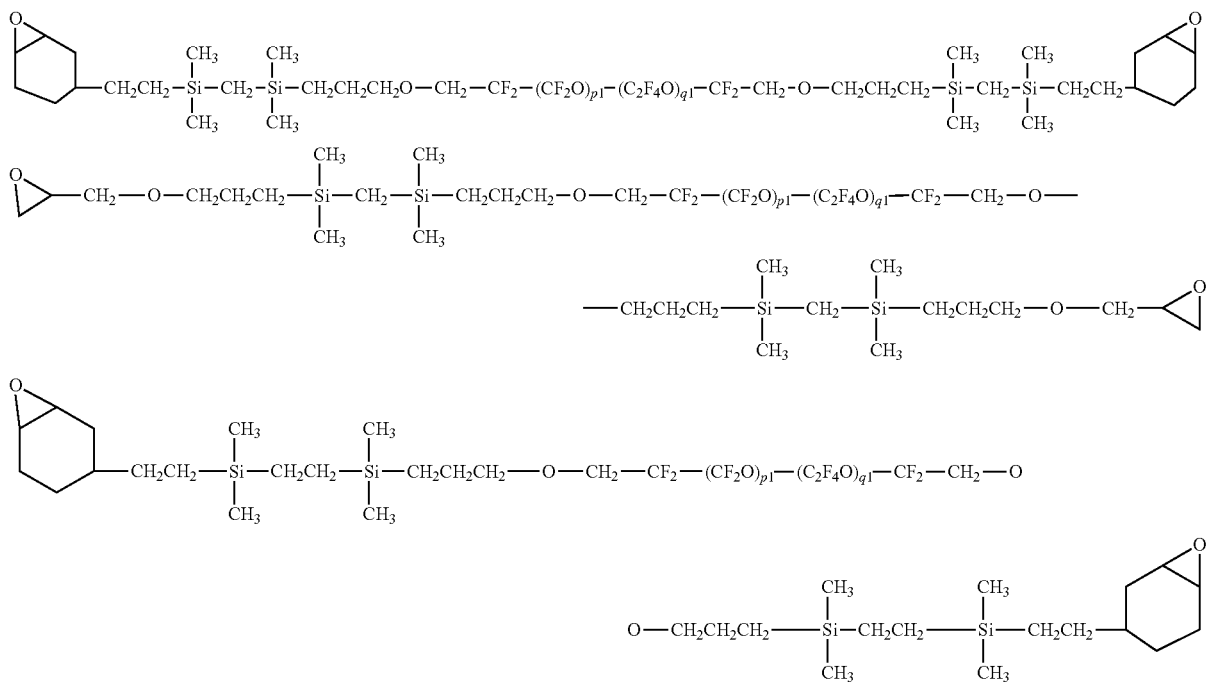

-continued

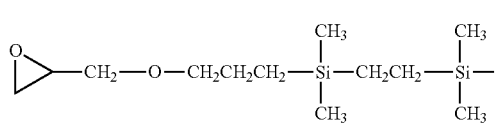
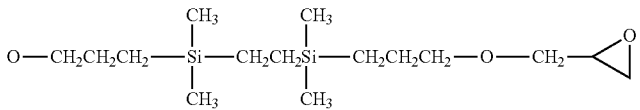

(In the formulae, Z and g are the same as above, p1 is an integer ranging from 5 to 100, q1 is an integer ranging from 5 to 100, p1+q1 is an integer ranging from 10 to 105, and each of the repeating units may be bonded at random.)

As a method for preparing the fluoropolyether group-containing polymer-modified organic silicon compound represented by above-described formula (1), for example, a following method can be exemplified.

Firstly, a fluoropolyether group-containing polymer having a reactive group such as an acid fluoride group, an acid halide group, an acid anhydride group, an ester group, a carboxylic acid group and an amide group at a terminal of a molecular chain; a nucleophilic agent having olefin such as an alkenyl group; and a fluorine organic solvent or a non-fluorine organic solvent such as, for example, 1,3-bis(trifluoromethyl)benzene or tetrahydrofuran, as a solvent are mixed, and are aged at a temperature from 0° C. to 80° C., preferably from 50° C. to 70° C., and more preferably at about 60° C. for 1 hour to 6 hours, preferably for 3 hours to 5 hours, and more preferably for about 4 hours.

Herein, as the fluoropolyether group-containing polymer having the reactive group at the terminal of the molecular chain, following compounds are exemplified specifically:

[Chem. 41]

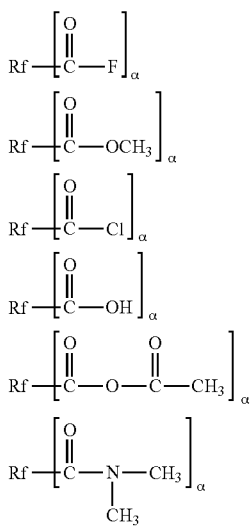

(in the formulae, Rf and α are the same as above.)

Moreover, as the nucleophilic agent having the olefin such as an alkenyl group, allylmagnesium halide, 3-butenylmagnesium halide, 4-pentenylmagnesium halide, 5-hexenylmagnesium halide and the like can be used. In addition, corresponding lithium reagents can also be used.

A using amount of the nucleophilic agent can be 2 equivalents to 5 equivalents, is more preferably 2.5 equivalents to 3.5 equivalents, and is further preferably about 3 equivalents per 1 equivalent of the reactive group of the fluoropolyether group-containing polymer having the reactive group at the terminal of the molecular chain.

Subsequently, the reaction is stopped, and a water layer and an organic solvent layer (preferably a fluorine organic solvent layer) are separated by a liquid separation operation. The obtained organic solvent layer is washed with, further preferably, a non-fluorine organic solvent so as to distil the solvent, thereby obtaining the fluoropolyether group-containing polymer having the hydroxyl group and the olefin moiety at the terminals of its molecular chain, which is represented by below formula (a):

[Chem. 42]

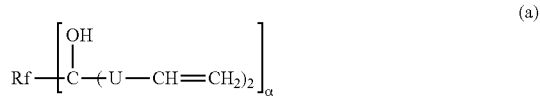

(in the formula, Rf and α are the same as above, and U is a divalent hydrocarbon group.)

In above formula (a), U is a divalent hydrocarbon group, and specifically, a $C_{1-8}$ alkylene group such as a methylene group, an ethylene group, a propylene group (a trimethylene group, a methylethylene group), a butylene group (a tetramethylene group, a methylpropylene group), a hexamethylene group and an octamethylene group, an alkylene group containing a $C_{6-8}$ arylene group such as a phenylene group (for example, a $C_{7-8}$ alkylene/arylene group and the like) and the like can be exemplified. As U, a $C_{1-4}$ straight-chain alkylene group is preferable.

Next, as necessary, a hydrogen atom of the hydroxyl group of the above-obtained fluoropolyether group-containing polymer having the hydroxyl group and the olefin moiety at the terminals of its molecular chain, which is represented by formula (a), is substituted with another group.

As a method for substituting the hydrogen atom of the hydroxyl group with a silyl group represented by —SiR$_3$, for example, the fluoropolyether group-containing polymer having the hydroxyl group and the olefin moiety at the terminals of its molecular chain, which is represented by formula (a), and a silylating agent are aged in the presence of a base such as amines and an alkali metal base, using a solvent such as a fluorine organic solvent and a non-fluorine organic solvent as necessary, at a temperature from 0° C. to 80° C., preferably from 40° C. to 60° C., and more preferably at about 50° C. for 1 hour to 24 hours, preferably for 2 hours to 10 hours, and more preferably for about 3 hours.

Further, as another method, the fluoropolyether group-containing polymer having the hydroxyl group and the olefin moiety at the terminals of its molecular chain, which is represented by formula (a), and hydrosilane are allowed to have a dehydrogenation reaction in the presence of a dehydrogenation catalyst such as a platinum group metal catalyst and a boron catalyst, using a solvent such as a fluorine organic solvent and a non-fluorine organic solvent, at a temperature from 0° C. to 60° C., preferably from 15° C. to 35° C., and more preferably at about 25° C. for 10 minutes to 24 hours, preferably for 30 minutes to 2 hours, and more preferably for about 1 hour.

Herein, as the silylating agent, for example, silyl halide, silyl triflate and the like can be used, and more specifically, trimethylsilyl chloride, triethylsilyl chloride, tert-butyldimethyl chloride, triisopropylsilyl chloride, triphenylsilyl chloride, trimethylsilyl bromide, trimethylsilyl triflate, triethylsilyl triflate, tert-butyldimethyl triflate, triisopropylsilyl triflate and the like can be exemplified. Further, in the case of not using the base, hexamethyl disilazane, trimethylsilyl dimethylamine, trimethylsilyl diethylamine or trimethylsilyl imidazole may be used, and a using amount thereof can be 1 equivalent to 10 equivalents, is more preferably 1 equivalent to 4 equivalents, and is further preferably about 2 equivalents per 1 equivalent of the hydroxyl group of the fluoropolyether group-containing polymer having the hydroxyl group and the olefin moiety at the terminals of its molecular chain, which is represented by formula (a).

Moreover, as the hydrosilane, trimethylsilane, triethylsilane, tert-butyldimethyl silane, triisopropyl silane, triphenyl silane and the like can be exemplified, and a using amount thereof can be 1 equivalent to 5 equivalents, is more preferably 1.5 equivalents to 3 equivalents, and is further preferably about 2 equivalents per 1 equivalent of the hydroxyl group of the fluoropolyether group-containing polymer having the hydroxyl group and the olefin moiety at the terminals of its molecular chain, which is represented by formula (a).

Subsequently, the reaction is stopped, and a water layer and an organic solvent layer (preferably a fluorine organic solvent layer) are separated by a liquid separation operation. The obtained organic solvent layer is washed with, further preferably, a non-fluorine organic solvent so as to distil the solvent, thereby obtaining a fluoropolyether group-containing polymer having a silyl group and an olefin moiety at terminals of its molecular chain, which is represented by following formula (b):

[Chem. 43]

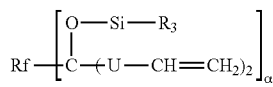

(b)

(in the formula, Rf, R, U and α are the same as above.)

Further, as a method for substituting the hydrogen atom of the hydroxyl group with a group represented by —W$_1$-Q'-W$_2$—X', for example, the fluoropolyether group-containing polymer having the hydroxyl group and the olefin moiety at the terminals of its molecular chain, which is represented by formula (a), and an organic silicon compound having an SiH group and the group represented by -Q'-W$_2$—X' are allowed to have a dehydrogenation reaction in the presence of a dehydrogenation catalyst such as a boron catalyst, using a solvent such as a fluorine organic solvent and a non-fluorine organic solvent, at a temperature from 0° C. to 60° C., preferably from 15° C. to 35° C., and more preferably at about 25° C., for 10 minutes to 24 hours, preferably for 30 minutes to 2 hours, and more preferably for about 1 hour. Alternatively, the hydroxyl group of the fluoropolyether group-containing polymer having the hydroxyl group and the olefin moiety at the terminals of its molecular chain, which is represented by formula (a), and an SiH group of one terminal of a bifunctional organosiloxane compound, organosilalkylene compound or organosilarylene compound, for example, which is represented by H-Q'-H, and in which both terminals are blocked by diorganohydrogensilyl groups (for example, —Si(CH$_3$)$_2$H or the like), are reacted with each other under the same conditions as above so as to once convert the hydrogen atom of the hydroxyl group into -Q'-H or the like, and further subsequently an SiH group at the other terminal is added with an alkenyl group of a compound having the alkenyl group and an X' group in its molecule (that is, a unsaturated aliphatic compound in which a terminal of the X' group is blocked by the alkenyl group) under conditions of an ordinary hydrosilylation reaction, whereby the hydrogen atom of the hydroxyl group can be finally substituted with the —W$_1$-Q'-W$_2$—X' group.

Herein, as the organic silicon compound having the SiH group and the group represented by -Q'-W$_2$—X' and the bifunctional organosiloxane compound, organosilalkylene compound or organosilarylene compound which is represented by H-Q'-H, and in which both terminals are blocked by the diorganohydrogensilyl groups, for example, following compounds can be exemplified:

[Chem. 44]

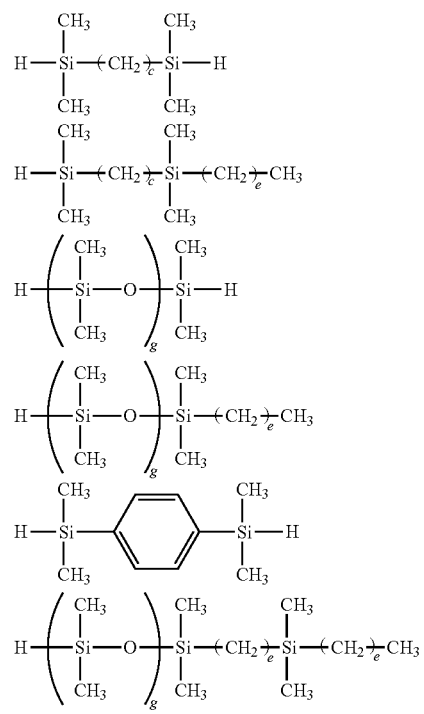

(in the formulae, g is the same as above, e is an integer ranging from 0 to 3, and c is an integer ranging from 1 to 4.)

Using amounts of these compounds can be 1 equivalent to 10 equivalents, and are more preferably 1.2 equivalents to 5 equivalents per 1 equivalent of the hydroxyl group of the fluoropolyether group-containing polymer having the hydroxyl group and the olefin moiety at the terminals of its molecular chain, which is represented by formula (a).

Further, as the compound having the alkenyl group and the X' group in its molecule, for example, allyl glycidyl ether, 1,2-epoxy-4-vinylcyclohexane, 1,2-epoxy-3-vinylcyclohexane and the like can be exemplified.

A using amount thereof can be 1 equivalent to 10 equivalents, and is more preferably 1.1 equivalents to 4 equivalents per 1 equivalent of the terminal SiH group of the material obtained by the reaction between: the fluoropolyether group-containing polymer having the hydroxyl group and the olefin moiety at the terminals of its molecular chain, which is represented by formula (a); and the compound in which both terminals are blocked by the diorganohydrogensilyl groups.

Subsequently, the reaction is stopped, and a water layer and an organic solvent layer (preferably, a fluorine organic solvent layer) are separated by a liquid separation operation. The obtained organic solvent layer is washed with, further preferably, a non-fluorine organic solvent so as to distil the solvent, thereby obtaining a fluoropolyether group-containing polymer, which has the olefin moiety at a terminal of its molecular chain, has an organic silicon compound group substituting for the hydroxyl group, and is represented by following formula (c):

[Chem. 45]

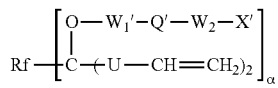

(c)

(in the formula, Rf, Q', $W_2$, X', U and α are the same as above, and WC is a single bond.)

Further, as another method for substituting the hydrogen atom of the hydroxyl group with the group represented by —$W_1$-Q'-$W_2$—X', for example, the hydrogen atom of the hydroxyl group in the fluoropolyether group-containing polymer having the hydroxyl group and the olefin moiety at the terminals of its molecular chain, which is represented by formula (a), is firstly substituted with a terminal unsaturated group, and thereafter, the terminal unsaturated group (an olefin moiety) and the other olefin moiety are reacted with the organic silicon compound having the SiH group.

As a method for substituting the hydrogen atom of the hydroxyl group with the terminal unsaturated group, for example, the fluoropolyether group-containing polymer having the hydroxyl group and the olefin moiety at the terminals of its molecular chain, which is represented by formula (a), and an olefin induction agent are aged in the presence of a base such as amines and an alkali metal base, using, as necessary, an additive for improving reactivity, such as tetrabutylammonium halide and alkali metal halide, and a solvent such as a fluorine organic solvent and a non-fluorine organic solvent, at a temperature from 0° C. to 90° C., preferably from 60° C. to 80° C., and more preferably at about 70° C. for 1 hour to 25 hours, preferably for 3 hours to 10 hours, and more preferably for about 5 hours to 8 hours.

Herein, as the olefin induction agent, for example, allyl halide and the like can be used, and more specifically, allyl chloride, allyl bromide, allyl iodide, 4-chloro-1-butene, 4-bromo-1-butene, 4-iodo-1-butene, 5-chloro-1-pentene, 5-bromo-1-pentene, 5-iodo-1-pentene and the like can be exemplified, and an using amount thereof can be 1 equivalent to 10 equivalents, is more preferably 2.5 equivalents to 6 equivalents, and is further preferably about 5 equivalents per 1 equivalent of the hydroxyl group of the fluoropolyether group-containing polymer having the hydroxyl group and the olefin moiety at the terminals of its molecular chain, which is represented by formula (a).

Subsequently, the reaction is stopped, and a water layer and an organic solvent layer (preferably a fluorine organic solvent layer) are separated by a liquid separation operation. The obtained organic solvent layer is washed with, further preferably, a non-fluorine organic solvent so as to distil the solvent, thereby obtaining a fluoropolyether group-containing polymer having the olefin moiety at a terminal of its molecular chain, which is represented by following formula (d):

[Chem. 46]

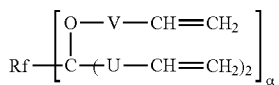

(d)

(in the formula, Rf, U and α are the same as above, and V is a single bond or a divalent hydrocarbon group.)

In above-described formula (d), V is a single bond or a divalent hydrocarbon group, and as the divalent hydrocarbon group, a $C_{1-8}$ alkylene group such as a methylene group, an ethylene group, a propylene group (a trimethylene group, a methylethylene group), a butylene group (a tetramethylene group, a methylpropylene group), a hexamethylene group and an octamethylene group, an alkylene group containing a $C_{6-8}$ arylene group such as a phenylene group (for example, a $C_{7-8}$ alkylene-arylene group and the like) and the like can be exemplified specifically. As V, a methylene group is preferable.

Subsequently, any of the above-obtained fluoropolyether group-containing polymers each having the olefin moiety at the terminal of the molecular chain, which are represented by formulae (a) to (d), respectively, and an organic silicon compound having two or more SiH groups in its molecule are aged in the presence of a toluene solution of a hydrosilylation reaction catalyst, for example, a chloroplatinic acid-vinylsiloxane complex, at a temperature from 40° C. to 120° C., preferably from 60° C. to 100° C., and more preferably at about 80° C. for 1 hour to 72 hours, preferably for 3 hours to 36 hours, and more preferably for 5 hours to 24 hours.

Herein, as the organic silicon compound having two or more SiH groups in its molecule, compounds represented by following formulae are preferable:

[Chem. 47]

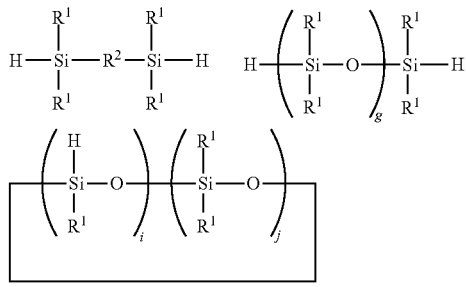

(in the formulae, $R^1$, $R^2$, g and j are the same as above, i is an integer ranging from 2 to 4, and is preferably 2, and i+j is an integer ranging from 3 to 10, and is preferably an integer ranging from 3 to 5.)

As this organic silicon compound having two or more SiH groups in its molecule, for example, following compounds and the like can be exemplified:

[Chem. 48]

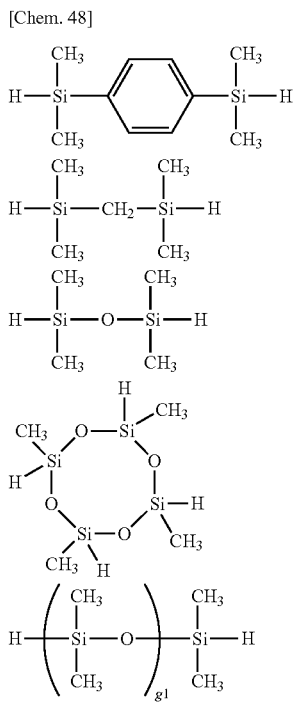

(in the formulae, g1 is the same as above.)

A using amount of the organic silicon compound having two or more SiH groups in its molecule can be 1 equivalent to 15 equivalents, is more preferably 1.1 equivalents to 10 equivalents, and is further preferably 1.2 equivalents to 6 equivalents per 1 equivalent of the terminal unsaturated aliphatic group of any of the fluoropolyether group-containing polymers each having the olefin moiety at the terminal of the molecular chain, which are represented by above formulae (a) to (d), respectively.

Further, a material obtained by the reaction between: any one of the above-obtained fluoropolyether group-containing polymers each having the olefin moiety at the terminal of the molecular chain, which are represented by formulae (a) to (d), respectively; and the organic silicon compound having two or more SiH groups in its molecule is aged with a compound having an olefin moiety and an epoxy group at terminals of its molecular chain, in the presence of a toluene solution of a hydrosilylation reaction catalyst, for example, a chloroplatinic acid-vinyl siloxane complex, at a temperature from 40° C. to 120° C., preferably from 60° C. to 100° C., and more preferably at about 80° C., for 5 hours to 48 hours, preferably for 6 hours to 36 hours, and more preferably for 7 hours to 24 hours.

Herein, as the compound having the olefin moiety and the epoxy group at the terminals of its molecular chain, allyl glycidyl ether, 1,2-epoxy-4-vinylcyclohexane, 1,2-epoxy-3-vinylcyclohexane and the like can be exemplified.

A using amount of the compound having the olefin moiety and the epoxy group at the terminals of its molecular chain can be 1 equivalent to 15 equivalents, is more preferably 1.1 equivalents to 10 equivalents, and is further preferably 1.2 equivalents to 6 equivalents, per 1 equivalent of the terminal SiH group of the material obtained by the reaction between: any one of the above-obtained fluoropolyether group-containing polymers each having the olefin moiety at the terminal of the molecular chain, which are represented by formulae (a) to (d), respectively; and the organic silicon compound having two or more SiH groups in its molecule.

Thereafter, the solvent and unreacted materials are distilled under a reduced pressure, whereby the fluoropolyether group-containing polymer-modified organic silicon compound represented by above formula (1) can be obtained. Incidentally, the above-described reaction can be caused solely or sequentially.

Next, as a method for preparing the fluoropolyether group-containing polymer-modified organic silicon compound represented by above formula (2), for example, a method similar to the above-explained preparation method of the fluoropolyether group-containing polymer-modified organic silicon compound represented by above formula (1) can be adopted except for using a fluoropolyether group-containing polymer having one olefin moiety at each terminal part of one terminal ($\alpha$=1) or both terminals ($\alpha$=2) of its molecular chain, instead of using any of the fluoropolyether group-containing polymers each having the olefin moiety at the terminal of its molecular chain, which are represented by formulae (a) to (d) respectively, and are explained in the preparation method of the fluoropolyether group-containing polymer-modified organic silicon compound represented by above formula (1) (that is, the fluoropolyether group-containing polymer having two (formula (a), (b) or (c)) or three (formula (d)) olefin moieties at each terminal part of the one terminal ($\alpha$=1) or both terminals ($\alpha$=2) of its molecular chain).

Herein, as the fluoropolyether group-containing polymer having the one olefin moiety at each terminal part of the one terminal ($\alpha$=1) or the both terminals ($\alpha$=2) of its molecular chain, following compounds can be exemplified specifically:

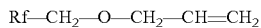

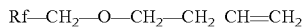

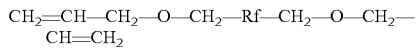

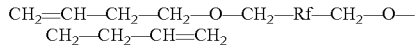
[Chem. 49]

(in the formulae, Rf is the same as above.)

The surface treatment agent of the present invention contains the fluoropolyether group-containing polymer-modified organic silicon compound represented by above formula (1) or (2).

The surface treatment agent of the present invention may further contain a fluoropolyether group-containing polymer represented by following general formula (5) (hereinafter, also called as a non-functional polymer):

[Chem. 50]

 (5)

(in the formula, A is a fluorine atom or a monovalent fluorine-containing group having —$CF_3$ group at a terminal, and Rf' is a divalent fluorooxyalkylene group-containing polymer residue.)

In above formula (5), A is a fluorine atom or a monovalent fluorine-containing group having a —$CF_3$ group at a terminal, and is preferably a fluorine atom or a $C_{1-6}$ straight-chain perfluoroalkyl group, and among them, a —F group, a —$CF_3$ group, a —$CF_2CF_3$ group and a —$CF_2CF_2CF_3$ group are preferable.

Further, Rf' is a divalent fluorooxyalkylene group-containing polymer residue, and as Rf', following compounds are preferable:

[Chem. 51]

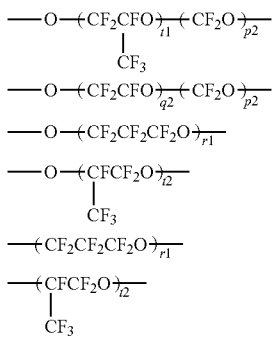

(in the formulae, p2 is an integer ranging from 5 to 200, and is preferably an integer ranging from 10 to 100, q2 is an integer ranging from 5 to 200, and is preferably an integer ranging from 10 to 100, r1 is an integer ranging from 10 to 200, and is preferably an integer ranging from 20 to 100, t1 is an integer ranging from 5 to 200, and is preferably an integer ranging from 10 to 100, t2 is an integer ranging from 10 to 200, and is preferably an integer ranging from 20 to 100, t1+p2 is an integer ranging from 10 to 205, and is preferably an integer ranging from 20 to 110, and q2+p2 is an integer ranging from 10 to 205, and is preferably an integer ranging from 20 to 110. Each of the repeating units may be bonded at random.)

As the non-functional polymer represented by formula (5), following compounds can be exemplified:

[Chem. 52]

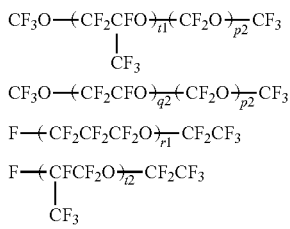

(in the formula, p2, q2, r1, t1 and t2 are the same as above. Each of the repeating units may be bonded at random.)

In the case of blending the non-functional polymer represented by formula (5), a using amount thereof is not limited particularly, but is preferably from 0.1% by weight to 60% by weight, and is particularly preferably within a range from 10% by weight to 40% by weight per weight of the fluoropolyether group-containing polymer-modified organic silicon compound represented by formula (1) or (2), and if the using amount of the non-functional polymer is too large, a problem of adhesion may be generated.

The surface treatment agent may contain an appropriate solvent. As this solvent, fluorine-modified aliphatic hydrocarbon-based solvents (perfluoroheptane, perfluorooctane and the like), fluorine-modified aromatic hydrocarbon-based solvents (m-xylene hexafluoride(1,3-bis(trifluoromethyl) benzene), benzotrifluoride and the like), fluorine-modified ether-based solvents (methylperfluorobutylether, ethylper- fluorobutylether, perfluoro(2-butyltetrahydrofuran) and the like), fluorine-modified alkylamine-based solvents (perfluorotributylamine, perfluorotripentylamine and the like), hydrocarbon-based solvents (petroleum benzine, mineral spirits, toluene, xylene and the like) and ketone solvents (acetone, methyl ethyl ketone, methyl isobutyl ketone and the like) can be exemplified. Among them, in the light of solubility, wettability and the like, fluorine-modified solvents are preferable, and in particular, m-xylene hexafluoride, perfluoro (2-butyltetrahydrofuran), perfluorotributylamine and ethylperfluorobutylether are preferable.

The above-described solvent may be a mixture two kinds or more among them, but it is preferable that the solvent can dissolve the fluoropolyether group-containing polymer-modified organic silicon compound represented by formula (1) or (2) and the non-functional polymer represented by formula (5) uniformly. Incidentally, appropriate concentration of the fluorooxyalkylene group-containing polymer to be dissolved into the solvent varies according to its treatment method, but 0.01% by weight to 40% by weight, in particular, 0.05% by weight to 25% by weight in the surface treatment agent is preferable.

A substrate to be treated by the surface treatment agent of the present invention is not limited particularly, and various materials such as paper, cloth, metals and their oxides, glass, plastics, ceramics and quartz may be used.

The surface treatment agent of the present invention can add excellent water repellent and oil repellent properties to the substrate. Particularly to resin products such as resin films and spectacle lenses, excellent water repellent and oil repellent properties can be shown. Herein, as the resin products, products made of thermoplastic resins are preferable, and more specifically, a thermoplastic resin film subjected to hard coat treatment (a hard coat film), a thermoplastic resin film with pencil hardness of 4H or more and free of the hard coat treatment (a high hardness resin film) or a thermoplastic resin film provided with an antireflection layer (an antireflection film) and the like can be preferably used.

Further, in the present invention, the surface treatment agent can be applied also to a substrate made of a metal, and exhibits favorable adhesion with respect to duralumin and the like.

The surface treatment agent of the present invention can be applied onto a substrate by well-known methods such as brush coating, dipping, spraying, and vapor deposition treatment. A heating method during the vapor deposition treatment is not limited particularly, and may be either of a resistance heating method and an electron beam heating method. Moreover, postprocessing conditions differ according to a postprocessing method, for example, in the case of applying the surface treatment agent by vapor deposition treatment or spray coating, if using a resin film treated by $SiO_2$ as a substrate, the postprocessing conditions can be at a temperature ranging from a room temperature (25° C.) to 200° C. for 5 minutes to 36 hours, in particular, 10 minutes to 24 hours, and the postprocessing may be carried out under humidified conditions. Particularly in the present invention, 10 minutes to 36 hours, in particular, 30 minutes to 24 hours is sufficient even at the room temperature. Further, a film thickness of a coating film is determined to appropriately according to a kind of the substrate, but is usually 0.1 nm to 100 nm, in particular, 1 nm to 25 nm.

As articles to be treated by the above-described surface treatment agent of the present invention, optical articles, touch panels, antireflection films, quartz substrates and the like, which are used as components or parts of products such as car navigation systems, mobile phones, digital cameras, digital video cameras, PDAs, portable audio players, car audio systems, game machines, spectacle lenses, camera lenses, lens filters, sunglasses, medical appliances including photogastroscopes, copying machines, PCs, liquid crystal displays, organic EL displays, plasma displays, touch panel displays, protection films, hard coat films, high hardness resins, antireflection films and wearable terminals, are preferable.

The surface treatment agent of the present invention can form a coating film to the above-described articles under mild conditions such as at a room temperature even in a short period of time, and this coating film can exhibit excellent water repellent and oil repellent properties and durability, and thus is useful particularly as a water repellent and oil repellent layer for spectacle lenses, touch panel displays, hard coat films, high hardness resins, antireflection films, wearable terminals and the like. Herein, the high hardness resin denotes a product obtained by molding a resin with pencil hardness of 4H or more, such as, for example, SILPLUS (trade name) produced by NIPPON STEEL Chemical Co., Ltd. and an HD film (trade name) produced by GUNZE LIMITED, which are publicized as glass substitute films, and particularly denotes a resin film obtained by molding these resins, but is not limited to the above-described products.

An article with a stain-proof surface layer made of a surface treatment agent which contains the fluoropolyether group-containing polymer-modified organic silicon compound of the present invention can exhibit excellent abrasion durability. A resin with a stain-proof surface layer made of the surface treatment agent of the present invention can be favorably used for purposes, in particular, spectacle lenses, sunglasses, touch panel displays, antireflection films and the like, whose surfaces require stain-proof treatment.

EXAMPLES

Hereinafter, the present invention is explained in more detail by way of Synthesis Examples, Examples and Comparative Examples, but the present invention is not limited by the Examples described below.

Examples and Comparative Examples adopt compounds which are obtained by below-described Synthesis Examples.

[Synthesis Example 1] Synthesis of Compound 1

In a reactor vessel, 150 g of tetrahydrofuran and 300 g of 1,3-bis(trifluoromethyl)benzene were mixed, and 160 ml of 0.7 M allyl magnesium bromide was dropped therein. Subsequently, after slowly dropping 200 g ($4.8 \times 10^{-2}$ mol) of a compound represented by below-described formula (A), the solution was heated at 60° C. for 4 hours. After stopping the heating, the solution was cooled to a room temperature, and was dropped into 300 g of 1.2 M aqueous solution of hydrochloric acid so as to stop their reaction. A fluorine compound layer that was a lower layer was collected by a liquid separation operation, and then was washed with acetone. A fluorine compound layer that was a lower layer after the wash was collected again, and a residual solvent was distilled under a reduced pressure, thereby obtaining a fluoropolyether group-containing polymer represented by below formula (B).

[Chem. 53]

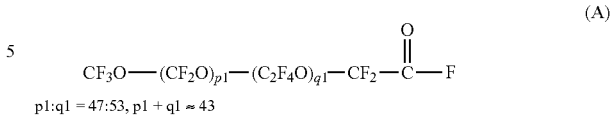

$p1:q1 = 47:53, p1 + q1 \approx 43$

[Chem. 54]

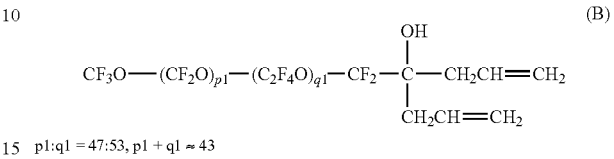

$p1:q1 = 47:53, p1 + q1 \approx 43$

In the reactor vessel, 80 g ($1.9 \times 10^{-2}$ mol) of the compound represented by below formula (B) was put, and was dissolved into 80 g of 1,3-bis(trifluoromethyl)benzene, and $8.0 \times 10^{-2}$ g of a toluene solution of a chloroplatinic acid-vinylsiloxane complex (containing $2.1 \times 10^{-2}$ mol of a Pt simple substance) and 37 g ($1.9 \times 10^{-1}$ mol) of 1,4-bis(dimethylsilyl)benzene were mixed therewith, and then, the solution was aged at 80° C. for 7 hours so as to distil the solvent and unreacted materials under a reduced pressure, thereby obtaining a fluoropolyether group-containing polymer represented by below formula (C).

[Chem. 55]

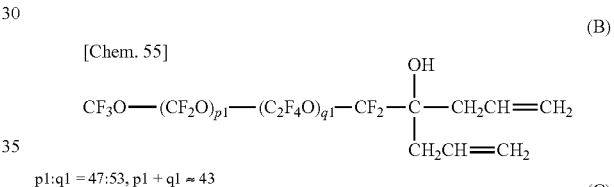

$p1:q1 = 47:53, p1 + q1 \approx 43$

[Chem. 56]

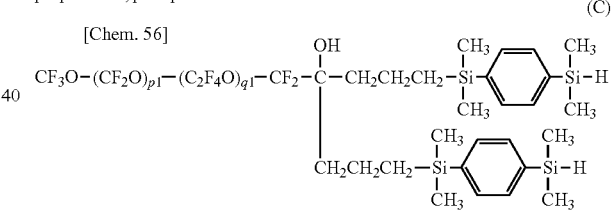

$p1:q1 = 47:53, p1 + q1 \approx 43$ $^1$H-NMR
δ 0-0.2 (—Si(C$\underline{H}_3$)$_2$) 24H
δ 0.4-0.6 (—C$\underline{H}_2$CH$_2$C$\underline{H}_2$—Si) 4H
δ 1.3-1.6 (—CH$_2$C$\underline{H}_2$CH$_2$—Si) 4H
δ 1.6-1.9 (—C$\underline{H}_2$CH$_2$CH$_2$—Si) 4H
δ 3.6-4.2 (—Si$\underline{H}$) 2H
δ 6.6-7.1 (—C$_6$$\underline{H}_4$) 8H In the reactor vessel, 27.7 g ($6.0 \times 10^{-3}$ mol) of a compound represented by below formula (C) was dissolved into 25 g of 1,3-bis(trifluoromethyl)benzene, and 2.3 g ($2.0 \times 10^{-2}$ mol) of allyl glycidyl ether, $2.5 \times 10^{-2}$ g of a toluene solution of a chloroplatinic acid-vinylsiloxane complex (containing $0.7 \times 10^{-6}$ mol of a Pt simple substance), 7.5 g (0.1 mol) of isopropyl alcohol and 0.5 g ($1.2 \times 10^{-2}$ mol) of acetonitrile were mixed therewith, and then, the solution was aged at 80° C. for 9 hours. After the aging, 0.01 g ($3.8 \times 10^{-6}$ mol) of triphenylphosphine which was dissolved into 3 g (0.09 mol) of methanol was added thereto, and the solvents and unreacted materials were distilled under a reduced pressure, thereby obtaining a liquid product (Compound 1).

[Chem. 57]

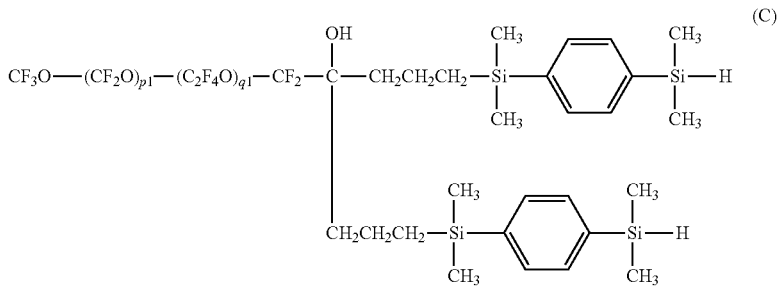

(C)

p1:q1 = 47:53, p1 + q1 ≈ 43

Above-obtained Compound 1 was confirmed to have a structure represented by following formula (D) by $^1$H-NMR.

[Chem. 58]

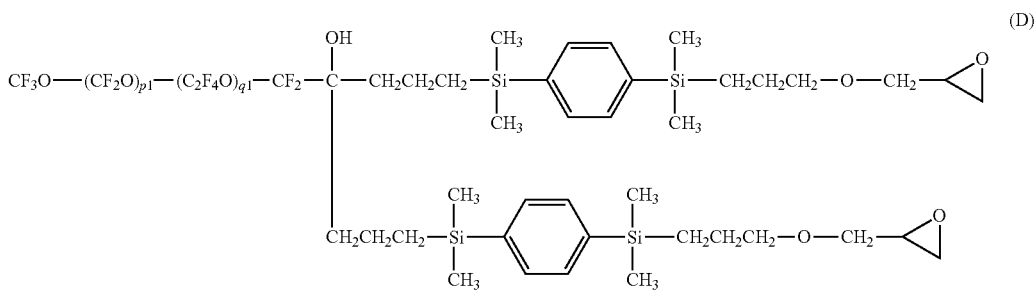

(D)

p1:q1 = 47:53, p1 + q1 ≈ 43

$^1$H-NMR

δ 0-0.2 (—Si(C$\underline{H}_3$)$_2$) 24H

δ 0.4-0.6 (—CH$_2$CH$_2$C$\underline{H}_2$—Si, —Si—C$\underline{H}_2$CH$_2$CH$_2$—) 8H δ 0.9-1.3 (—C$\underline{H}_2$CH$_2$CH$_2$—Si, —Si—CH$_2$C$\underline{H}_2$CH$_2$—) 12H δ 2.5-4.0 (—CH$_2$CH$_2$C$\underline{H}_2$—O—C$\underline{H}_2$—C$\underline{H}$—O—C$\underline{H}_2$—) 14H

[Synthesis Example 2] Synthesis of Compound 2

In a reactor vessel, after mixing 100 g of 1,3-bis(trifluoromethyl)benzene, 8.2 g (5.4×10$^{-2}$ mol) of DBU (diazabicycloundecene) and 114 g (2.7×10$^{-2}$ mol) of a compound represented by below formula (B), 5.8 g (5.4×10$^{-2}$ mol) of trimethylchlorosilane was dropped therein. Subsequently, the solution was heated at 50° C. for 3 hours. After the heating, the solution was cooled to a room temperature, and an aqueous solution of hydrochloric acid was dropped therein. A fluorine compound layer that was a lower layer was collected by a liquid separation operation, and was subsequently washed with methanol. A fluorine compound layer that was a lower layer after the wash was collected again, and a residual solvent was distilled under a reduced pressure, thereby obtaining a fluoropolyether group-containing polymer represented by below formula (E).

[Chem. 59]

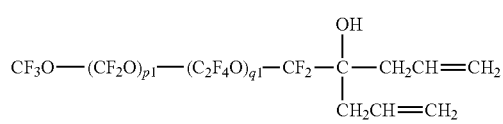

(B)

p1:q1 = 47:53, p1 + q1 ≈ 43

[Chem. 60]

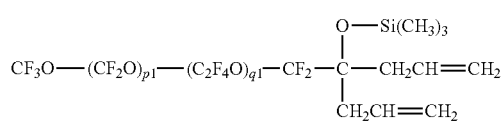

(E)

p1:q1 = 47:53, p1 + q1 ≈ 43

$^1$H-NMR

δ 0-0.2 (—OSi(C$\underline{H}_3$)$_3$) 9H

δ 2.4-2.6 (—C$\underline{H}_2$CH=CH$_2$) 4H

δ 5.0-5.2 (—CH$_2$CH=C$\underline{H}_2$) 4H

δ 5.7-5.9 (—CH$_2$C$\underline{H}$=CH$_2$) 2H

In a reactor vessel, 168 g (3.9×10$^{-2}$ mol) of a compound represented by below formula (E) was put, and was dissolved into 150 g of 1,3-bis(trifluoromethyl)benzene, 8.0× 10$^{-2}$ g of a toluene solution of a chloroplatinic acid-vinylsiloxane complex (containing 4.0×10$^{-6}$ mol of a Pt simple substance) and 83 g ($4.0\times10^{-1}$ mol) of 1,1,3,3,5,5-hexamethyltrisiloxane were mixed therewith, and then, the solution was aged at 80° C. for 24 hours so as to distil the solvent and unreacted materials under a reduced pressure, thereby obtaining a fluoropolyether group-containing polymer represented by following formula (F).

[Chem. 61]

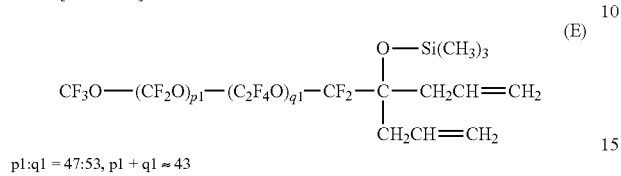

p1:q1 = 47:53, p1 + q1 ≈ 43

[Chem. 62]

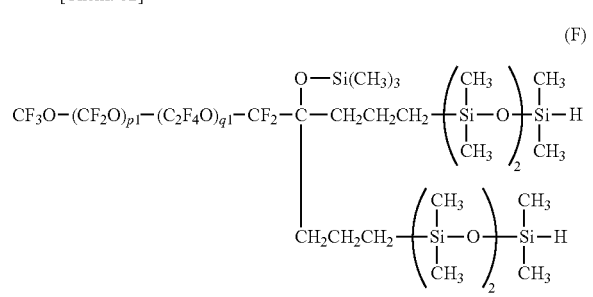

p1:q1 = 47:53, p1 + q1 ≈ 43

$^1$H-NMR

δ 0-0.2 (—OSi(C$\underline{H}_3$)$_3$, —OSi(CH$_3$)$_2$—) 45H

δ 0.3-0.6 (—CH$_2$CH$_2$C$\underline{H}_2$—Si) 4H

δ 1.3-1.8 (—C$\underline{H}_2$CH$_2$CH$_2$—Si, —CH$_2$C$\underline{H}_2$CH$_2$—Si) 8H δ 3.3-3.6 (—Si$\underline{H}$) 2H In a reactor vessel, 30.6 g ($6.5\times10^{-3}$ mol) of a compound represented by following formula (F) was dissolved into 25 g of 1,3-bis(trifluoromethyl)benzene, and 2.3 g ($2.0\times10^{-2}$ mol) of allyl glycidyl ether, $2.5\times10^{-2}$ g of a toluene solution of a chloroplatinic acid-vinylsiloxane complex (containing $0.7\times10^{-6}$ mol of a Pt simple substance), 8.0 g (0.1 mol) of isopropyl alcohol and 0.5 g ($1.2\times10^{-2}$ mol) of acetonitrile were mixed therewith, and then, the solution was aged at 80° C. for 23 hours. After the aging, 0.01 g ($3.8\times10^{-6}$ mol) of triphenylphosphine that was dissolved into 3 g (0.09 mol) of methanol was added thereto, and the solvents and unreacted materials were distilled under a reduced pressure, thereby obtaining a liquid product (Compound 2).

[Chem. 63]

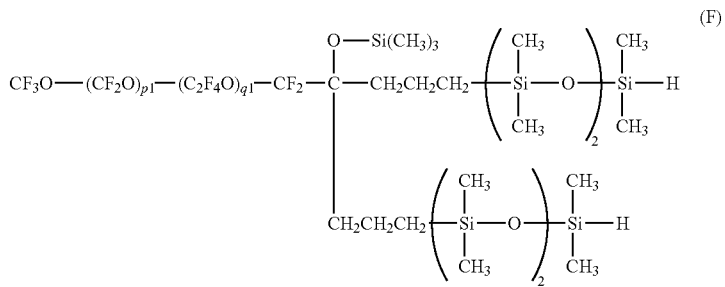

p1:q1 = 47:53, p1 + q1 ≈ 43

Above-obtained Compound 2 was confirmed to have a structure represented by following formula (G) by $^1$H-NMR.

[Chem. 64]

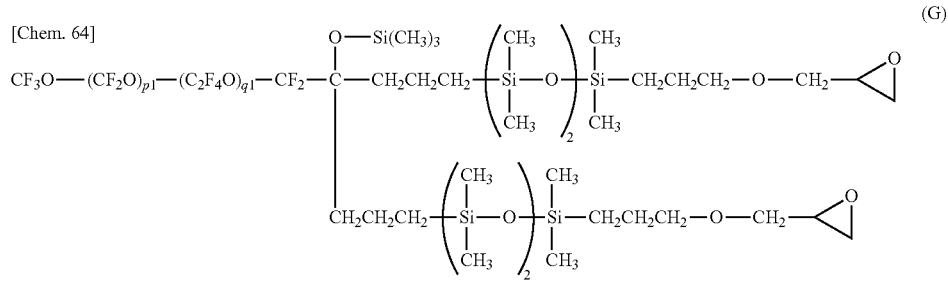

p1:q1 = 47:53, p1 + q1 ≈ 43

¹H-NMR

δ 0-0.5 (—OSi—C$\underline{H}_3$, —OSi(C$\underline{H}_3$)$_3$) 45H

δ 0.5-0.9 (—C$\underline{H}_2$CH$_2$C$\underline{H}_2$—Si—O—, —O—Si—C$\underline{H}_2$CH$_2$CH$_2$—) 8H δ 1.5-2.0 (—C$\underline{H}_2$CH$_2$CH$_2$—Si—O—, —O—Si—CH$_2$C$\underline{H}_2$CH$_2$—) 12H δ 2.5-4.0 (—CH$_2$CH$_2$C$\underline{H}_2$—O—C$\underline{H}_2$—C$\underline{H}$—O—C$\underline{H}_2$—) 14H

[Synthesis Example 3] Synthesis of Compound 3

In a reactor vessel, 169 g (4.0×10⁻² mol) of a compound represented by below formula (B) was put, and was dissolved into 150 g of 1,3-bis(trifluoromethyl)benzene, 8.0×10⁻² g of a toluene solution of a chloroplatinic acid-vinylsiloxane complex (containing 4.0×10⁻⁶ mol of a Pt simple substance) and 83 g (4.0×10⁻¹ mol) of 1,1,3,3,5,5-hexamethyltrisiloxane were mixed therewith, and the solution was aged at 80° C. for 24 hours so as to distil the solvent and unreacted materials under a reduced pressure, thereby obtaining a fluoropolyether group-containing polymer represented by below formula (H).

[Chem. 65]

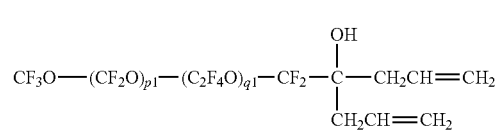
(B)

p1:q1 = 47:53, p1 + q1 ≈ 43

[Chem. 66]

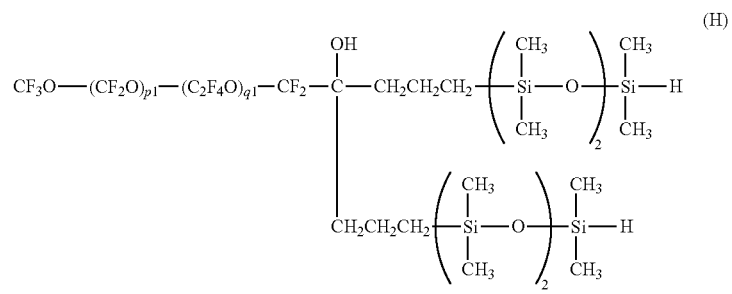
(H)

p1:q1 = 47:53, p1 + q1 ≈ 43

¹H-NMR

δ 0-0.2 (—OSi(C$\underline{H}_3$)$_2$) 36H

δ 0.3-0.6 (—CH$_2$CH$_2$C$\underline{H}_2$—Si) 4H

δ 1.3-1.8 (—C$\underline{H}_2$CH$_2$CH$_2$—Si, —CH$_2$C$\underline{H}_2$CH$_2$—Si) 8H δ 3.3-3.6 (—SiH) 2H In a reactor vessel, 27.8 g (6.0×10⁻³ mol) of a compound represented by below formula (H), 25 g of 1,3-bis(trifluoromethyl)benzene, 4.09 g (3.3×10⁻² mol) of 1,2-epoxy-4-vinylcyclohexane, 2.5×10⁻² g of a toluene solution of a chloroplatinic acid-vinylsiloxane complex (containing 0.7×10⁻⁶ mol of a Pt simple substance), 8.0 g (0.1 mol) of isopropyl alcohol and 0.5 g (1.2×10⁻² mol) of acetonitrile were mixed therewith, and then, the solution was aged at 80° C. for 9 hours. After the aging, 0.01 g (3.8×10⁻⁶ mol) of triphenylphosphine that was dissolved into 3 g (0.09 mol) of methanol was added thereto, and the solvents and unreacted materials were distilled under a reduced pressure, thereby obtaining a liquid product (Compound 3).

[Chem. 67]

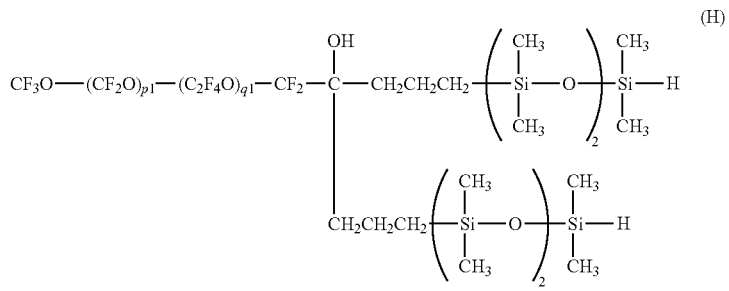

p1:q1 = 47:53, p1 + q1 ≈ 43

Above-obtained Compound 3 was confirmed to have a structure represented by following formula (I) by $^1$H-NMR.

[Chem. 68]

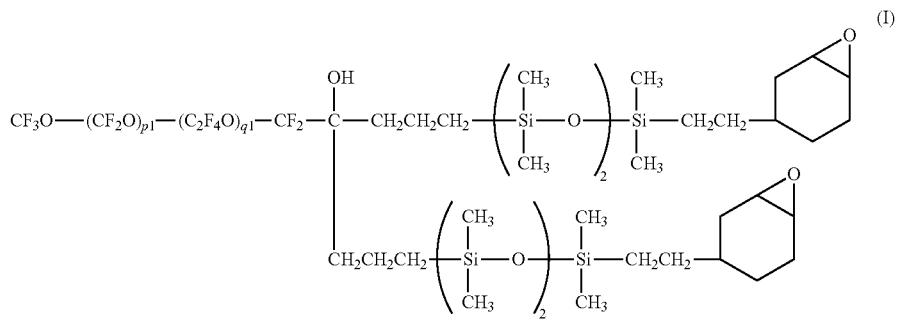

p1:q1 = 47:53, p1 + q1 ≈ 43

$^1$H-NMR
δ 0-0.5 (—OSi(C$\underline{H}_3$)$_2$) 36H
δ 0.5-0.9 (—C$\underline{H}_2$CH$_2$C$\underline{H}_2$—Si—O—, —O—Si—C$\underline{H}_2$CH$_2$—) 8H
δ 1.0-2.4 (—C$\underline{H}_2$C$\underline{H}_2$CH$_2$—Si—O—, —O—Si—CH$_2$C$\underline{H}_2$—, —CH$_2$C$\underline{H}_2$—C$\underline{H}$CH$_2$C$\underline{H}$—O—CHC$\underline{H}_2$C$\underline{H}_2$—) 26H
δ 3.0-3.3 (—C$\underline{H}$—O—C$\underline{H}$) 4H

[Synthesis Example 4] Synthesis of Compound 4

In a reactor vessel, 27.8 g (6.0×10$^{-3}$ mol) of a compound represented by below formula (H) was dissolved into 25 g of 1,3-bis(trifluoromethyl)benzene, and 2.3 g (2.0×10$^{-2}$ mol) of allyl glycidyl ether, 2.5×10$^{-2}$ g of a toluene solution of a chloroplatinic acid-vinylsiloxane complex (containing 0.7× 10$^{-6}$ mol of a Pt simple substance), 8.0 g (0.1 mol) of isopropyl alcohol and 0.5 g (1.2×10$^{-2}$ mol) of acetonitrile were mixed therewith, and then, the solution was aged at 80° C. for 23 hours. After the aging, 0.01 g (3.8×10$^{-6}$ mol) of triphenylphosphine that was dissolved into 3 g (0.09 mol) of methanol was added thereto, and the solvents and unreacted materials were distilled under a reduced pressure, thereby obtaining a liquid product (Compound 4).

[Chem. 69]

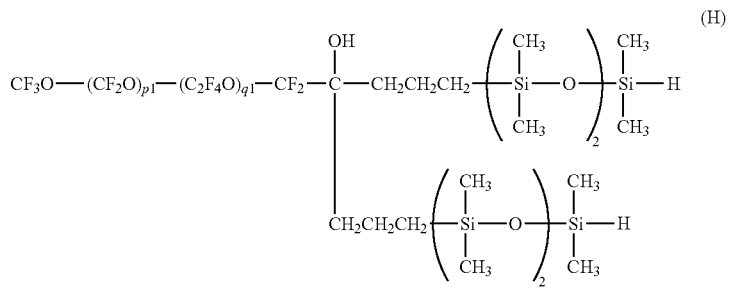

p1:q1 = 47:53, p1 + q1 ≈ 43

Above-obtained Compound 4 was confirmed to have a structure represented by following formula (J) by $^1$H-NMR.

[Chem. 70]

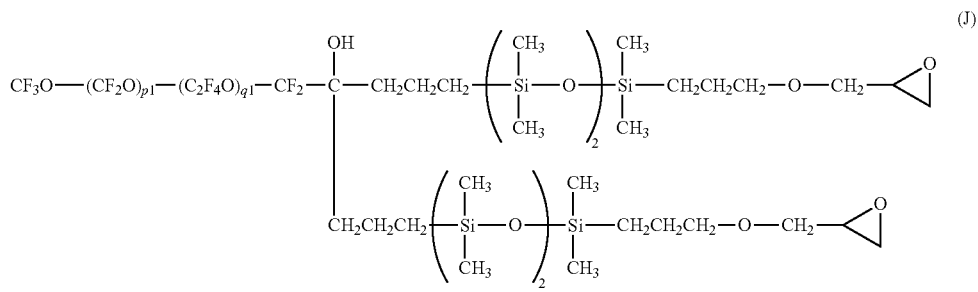

(J)

p1:q1 = 47:53, p1 + q1 ≈ 43

$^1$H-NMR
δ 0-0.5 (—OSi(C$\underline{H}_2$)$_2$) 36H
δ 0.5-0.9 (—C$\underline{H}_2$CH$_2$C$\underline{H}_2$—Si—O—, —O—Si—C$\underline{H}_2$CH$_2$CH$_2$—) 8H
δ 1.5-2.0 (—CH$_2$C$\underline{H}_2$CH$_2$—Si—O—, —O—Si—CH$_2$C$\underline{H}_2$CH$_2$—) 12H
δ 2.5-4.0 (—CH$_2$CH$_2$C$\underline{H}_2$—O—C$\underline{H}_2$—C$\underline{H}$—O—C$\underline{H}_2$—) 14H

[Synthesis Example 5] Synthesis of Compound 5

In a reactor vessel, 29.6 g (0.7×10$^{-2}$ mol) of a compound represented by following formula (B) was put, and was dissolved into 25 g of 1,3-bis(trifluoromethyl)benzene, 2.5× 10$^{-2}$ g of a toluene solution of a chloroplatinic acid-vinylsiloxane complex (containing 0.7×10$^{-6}$ mol of a Pt simple substance) and 9.2 g (0.7×10$^{-1}$ mol) of bis(dimethylsilyl)methane were mixed therewith, and were aged at 80° C. for 24 hours so as to distil the solvent and unreacted materials under a reduced pressure, thereby obtaining a fluoropolyether group-containing polymer represented by below formula (K).

[Chem. 71]

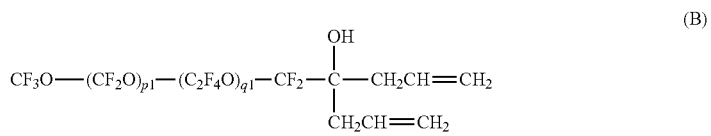

(B)

p1:q1 = 47:53, p1 + q1 ≈ 43

[Chem. 72]

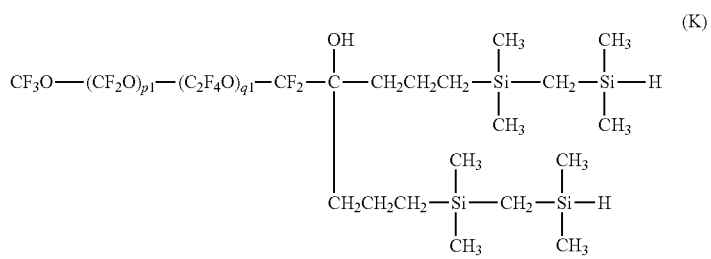

(K)

p1:q1 = 47:53, p1 + q1 ≈ 43

$^1$H-NMR
δ 0-0.4 (—Si(C$\underline{H}_3$)$_2$, —Si—C$\underline{H}_2$—Si) 28H
δ 0.4-0.8 (—C$\underline{H}_2$CH$_2$C$\underline{H}_2$—Si) 4H
δ 1.2-2.0 (—CH$_2$C$\underline{H}_2$CH$_2$—Si) 8H
δ 3.8-4.2 (—Si$\underline{H}$) 2H In a reactor vessel, 26.9 g (6.0×10$^{-3}$ mol) of a compound represented by below formula (K) was dissolved into 25 g of 1,3-bis(trifluoromethyl)benzene, and 2.3 g (2.0×10$^{-2}$ mol) of allyl glycidyl ether, 2.5×10$^{-2}$ g of a toluene solution of a chloroplatinic acid-vinylsiloxane complex (containing 0.7×10$^{-6}$ mol of a Pt simple substance), 8.0 g (0.1 mol) of isopropyl alcohol and 0.5 g (1.2×10$^{-2}$ mol) of acetonitrile were mixed therewith, and then, the solution was aged at 80° C. for 23 hours. After the aging, 0.01 g (3.8×10$^{-6}$ mol) of triphenylphosphine that was dissolved into 3 g (0.09 mol) of methanol was added thereto, and the solvents and unreacted materials were distilled under a reduced pressure, thereby obtaining a liquid product (Compound 5).

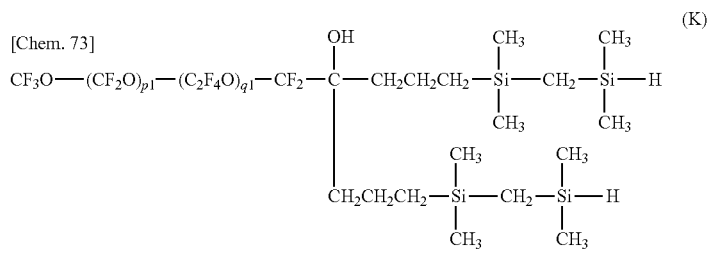

[Chem. 73] (K)

p1:q1 = 47:53, p1 + q1 ≈ 43

Above-obtained Compound 5 was confirmed to have a structure represented by following formula (L) by $^1$H-NMR.

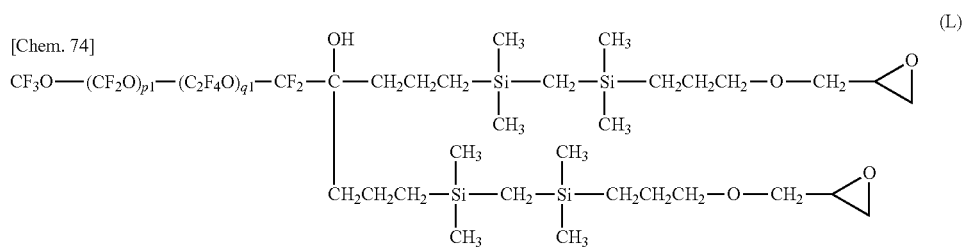

[Chem. 74] (L)

p1:q1 = 47:53, p1 + q1 ≈ 43

$^1$H-NMR
δ 0-0.4 (—Si(C$\underline{H}_3$)$_2$, —Si—C$\underline{H}_2$—Si) 28H
δ 0.4-0.8 (—C$\underline{H}_2$CH$_2$C$\underline{H}_2$—Si, —Si—C$\underline{H}_2$CH$_2$CH$_2$) 8H
δ 1.2-2.0 (—CH$_2$C$\underline{H}_2$CH$_2$—Si, —Si—CH$_2$C$\underline{H}_2$CH) 12H
δ 2.5-4.0 (—CH$_2$CH$_2$C$\underline{H}_2$—O—C$\underline{H}_2$—CH—O—C$\underline{H}_2$—) 14H

[Synthesis Example 6] Synthesis of Compound 6

In a reactor vessel, 58.6 g (1.4×10$^{-2}$ mol) of a compound represented by below formula (M) was put, and was dissolved into 50 g of 1,3-bis(trifluoromethyl)benzene, and 5.0×10$^{-2}$ g of a toluene solution of a chloroplatinic acid-vinylsiloxane complex (containing 2.5×10$^{-6}$ mol of a Pt simple substance) and 15.6 g (7.5×10$^{-2}$ mol) of 1,1,3,3,5,5-hexamethyltrisiloxane were mixed therewith, and then the solution was aged at 80° C. for 5 hours so as to distil the solvent and unreacted materials under a reduced pressure, thereby obtaining a fluoropolyether group-containing polymer represented by below formula (N).

[Chem. 75]

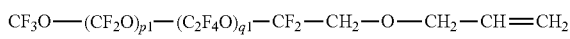

(M)

p1:q1 = 47:53, p1 + q1 ≈ 43

[Chem. 76]

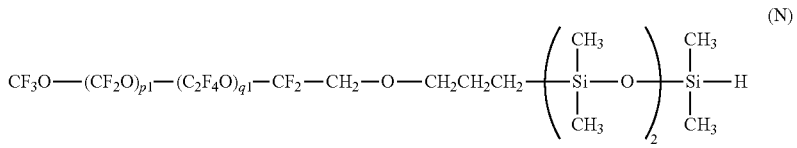

(N)

p1:q1 = 47:53, p1 + q1 ≈ 43

$^1$H-NMR
δ 0-0.4 (—OSi(C$\underline{H}_3$)$_2$—) 18H
δ 0.4-0.8 (—C$\underline{H}_2$CH$_2$CH$_2$—Si) 2H
δ 1.3-1.8 (—CH$_2$C$\underline{H}_2$CH$_2$—Si) 2H
δ 3.3-3.9 (—CH$_2$CH$_2$C$\underline{H}_2$—Si) 4H
δ 4.6-4.9 (—Si$\underline{H}$) 1H In a reactor vessel, 17.6 g (4.0×10$^{-3}$ mol) of a compound represented by below formula (N), 25 g of 1,3-bis(trifluoromethyl)benzene, 0.74 g (6.0×10$^{-3}$ mol) of 1,2-epoxy-4-vinylcyclohexane, 1.5×10$^{-2}$ g of a toluene solution of a chloroplatinic acid-vinylsiloxane complex (containing 0.4× 10$^{-6}$ mol of a Pt simple substance), 4.5 g (8.0×10$^{-2}$ mol) of isopropyl alcohol and 0.2 g (4.8×10$^{-3}$ mol) of acetonitrile were mixed therewith, and then, the solution was aged at 80° C. for 9 hours. After the aging, 0.01 g (3.8×10$^{-6}$ mol) of triphenylphosphine that was dissolved into 3 g (0.09 mol) of methanol was added thereto, and the solvents and unreacted materials were distilled under a reduced pressure, thereby obtaining a liquid product (Compound 6).

[Chem. 77]

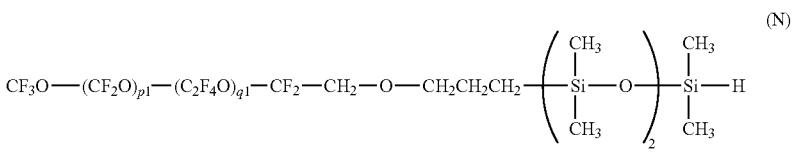

(N)

p1:q1 = 47:53, p1 + q1 ≈ 43

Above-obtained Compound 6 was confirmed to have a structure represented by following formula (O) by

[Chem. 78]

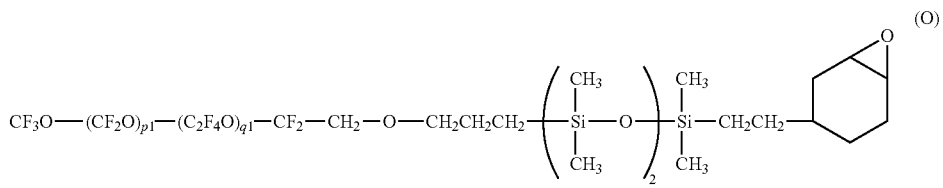

(O)

p1:q1 = 47:53, p1 + q1 ≈ 43

$^1$H-NMR
δ 0-0.5 (—OSi(CH₃)₂) 18H
δ 0.5-0.9 (—CH₂CH₂CH₂—Si—O—, —O—Si—CH₂CH₂—) 4H
δ 1.0-2.2 (—CH₂—O—CH₂CH₂CH₂—Si, —Si—CH₂CH₂—CHCH₂CH—O—CHCH₂CH₂—) 11H
δ 2.8-3.0 (—CH—O—CH—) 2H
δ 3.5-3.9 (—CH₂—O—CH₂CH₂CH₂—) 4H

In Comparative Examples, following compounds were used.

[Chem. 79]

[Compound 7]

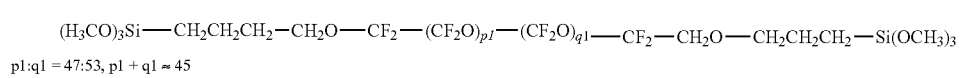

p1:q1 = 47:53, p1 + q1 ≈ 45

[Chem. 80]

[Compound 8]

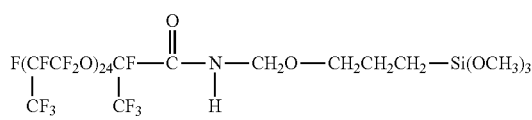

Examples 1 to 6 and Comparative Examples 1 and 2

Preparation of Surface Treatment Agent and Formation of Coating Film

Each of above-described Compounds 1 to 8 was dissolved into Novec 7200 (produced by 3M Company, ethyl perfluorobutyl ether) so that its concentration might be 20% by weight, thereby preparing a surface treatment agent. After the preparation of the surface treatment agent, a resin film (produced by Tigold Corporation) was washed by plasma treatment (Ar: 10 cc, O₂: 80 cc, Output: 250 W, Time: 30 seconds), and 10 mg of the surface treatment agent was deposited thereon in vacuum (treatment conditions at pressure: $2.0 \times 10^{-2}$ Pa and at a heating temperature: 700° C.), whereby a coating film with a film thickness of 15 nm was formed under an environment at 25° C. and humidity of 50% RH after 24 hours. Incidentally, as the resin film, a polyethylene terephthalate film, whose film surface was subjected to acrylic hard-coat treatment, and whose outermost surface was treated by sputtering SiO₂ to obtain a thickness of 100 nm, was used.

Further, as another substrate, duralumin, to which the treatment agent was deposited in vacuum in conditions similar to those of the resin film, thereby forming a coating film with a film thickness of 15 nm under an environment at 80° C. after 30 minutes.

The coating films formed using Compounds 1 to 6 were adopted in Examples 1 to 6, and the coating films formed using Compounds 7 and 8 were adopted in Comparative Examples 1 and 2.

The coating films of Examples 1 to 6 and Comparative Examples 1 and 2 were evaluated by a following method. All of tests were carried out at 25° C. and humidity of 50% RH.

[Evaluation of Abrasion Resistance]

Abrasion resistance of each of the obtained coating films with respect to cloth (BEMCOT M-3II) was measured by TRIBOGEAR TYPE: 30S (produced by Shinto Scientific Co., Ltd.).

According to following test conditions, the test was finished at a time when a water contact angle became less than 100°. The number of abrasion which could keep the water contact angle of 100° or more was adopted as a criterion for the abrasion resistance.

Contact Area: 10 mm×30 mm
Load: 1.5 kg
Test Conditions
  Cloth: BEMCOT M-3II (produced by Asahi Kasei Corporation)
  Moving Distance (One Way): 20 mm
  Moving Speed: 1,800 mm/minute
  Load: 0.5 kg/cm²

Further, as the water contact angle, a contact angle with respect to water of the coating film (droplet: 2 μl) was measured by a contact angle meter, DropMaster (produced by KYOWA INTERFACE SCIENCE CO., LTD.). Incidentally, the water contact angle was measured 1 second after dropping 2 μl of droplet onto a surface of the sample.

TABLE 1

| Treatment Agent | Compound | Abrasion Resistance (Number) | |
| --- | --- | --- | --- |
| | | Resin Film | Duralumin |
| Example 1 | 1 | 2,000 | 5,000 |
| Example 2 | 2 | 3,000 | 5,000 |
| Example 3 | 3 | 3,000 | 15,000 |
| Example 4 | 4 | 3,000 | 15,000 |
| Example 5 | 5 | 3,000 | 10,000 |
| Example 6 | 6 | 2,500 | 10,000 |
| Comparative Example 1 | 7 | 0 | 2,000 |
| Comparative Example 2 | 8 | 0 | 1,000 |

According to above Table 1, in Comparative Examples 1 and 2, if the surface treatment agent was applied to the surface of the substrate by vapor deposition coating, and the abrasion resistance test was conducted after postprocessing, each of their abrasion resistance was inferior to that of Examples. On the other hand, in Examples 1 to 6, if the surface treatment agent was applied to the surface of the substrate by vapor deposition coating, and the abrasion resistance test was conducted after the postprocessing, each of their coating films exhibited excellent abrasion resistance. Since each of the coating films of Examples 1 to 6 had a siloxane bond, a silphenylene structure or a silalkylene structure at the terminal of the molecular chain (at a connecting group part of molecules), the polymer in the surface treatment agent was easily orientated and had an epoxy group at the terminal, whereby its adhesion to the substrate was considered to increased more than those of the surface treatment agents of Comparative Examples.

INDUSTRIAL APPLICABILITY

An article with a surface treated by a surface treatment agent containing the fluoropolyether group-containing polymer-modified organic silicon compound of the present invention exhibits excellent abrasion durability. An article with a surface treated by the surface treatment agent of the present invention is effective particularly as a product such as a touch panel display, an antireflection film and a spectacle lense, to which oil is expected to be attached.

The invention claimed is:

1. A fluoropolyether group-containing polymer-modified organic silicon compound represented by a following general formula (1) or (2):

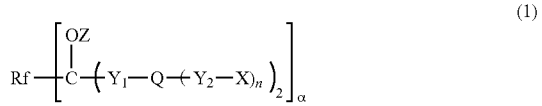

(1)

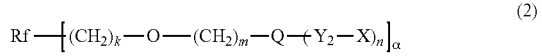

(2)

wherein Rf is a monovalent or divalent fluorooxyalkylene group-containing polymer residue, Rf' is a monovalent fluorooxyalkylene group-containing polymer residue represented by a following general formula (3'):

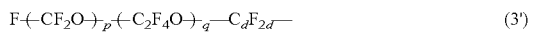

(3')

wherein each of p and q is independently an integer ranging from 0 to 200, p+q is an integer ranging from 3 to 200, each of the repeating units may be a straight chain or a branched chain, the respective repeating units may be bonded to each other at random, d is an integer ranging from 1 to 3, and the unit ($-C_dF_{2d}-$) may be a straight chain or a branched chain, each of $Y_1$ and $Y_2$ is independently a single bond or a divalent hydrocarbon group, Q is a group selected from the groups represented by following formulae:

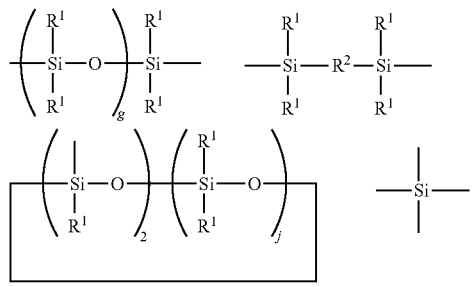

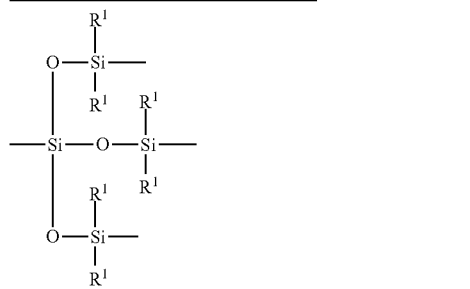

wherein $R^1$ is independently a $C_{1-4}$ alkyl group or a phenyl group, $R^2$ is a $C_{1-4}$ alkylene group or a $C_{6-12}$ arylene group, $R^3$ is $R^1$, g is an integer ranging from 1 to 20, and j is an integer ranging from 1 to 8, X is independently a glycidoxy group, a glycidoxyalkyl group, an alicyclic epoxy group or an alicyclic epoxy-containing alkyl group, k is an integer ranging from 0 to 2, m is an integer ranging from 1 to 5, n is an integer ranging from 1 to 3, Z is independently a hydrogen atom, a triorganosilyl group represented by a following formula:

wherein each R is independently a $C_{1-4}$ alkyl group or phenyl group, or a group represented by a following formula:

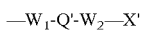

wherein X' is X or $-SiR_3$ (R is the same as above), each of $W_1$ and $W_2$ is independently a single bond or a divalent hydrocarbon group, Q' is a divalent group having a structure selected from a diorganosilylene group, an organosiloxane residue, a silalkylene structure, a silarylene structure and combinations of them, and wherein α is 1 or 2 in the formula (1), and α is 1 in the formula (2).

2. The fluoropolyether group-containing polymer-modified organic silicon compound according to claim 1, wherein, in the formula (1), α is 1, and Rf is a monovalent fluorooxyalkylene group-containing polymer residue represented by a following general formula (3):

[Chem. 2]

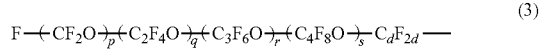

(3)

wherein each of p, q, r and s is independently an integer ranging from 0 to 200, p+q+r+s is an integer ranging from 3 to 200, each of the repeating units may be a straight chain or a branched chain, the respective repeating units may be bonded to each other at random, d is an integer ranging from 1 to 3, and the unit ($-C_dF_{2d}-$) may be a straight chain or a branched chain.

3. The fluoropolyether group-containing polymer-modified organic silicon compound according to claim 1, wherein, in the formula (1), α is 2, and Rf is a divalent fluorooxyalkylene group-containing polymer residue represented by a following general formula (4):

[Chem. 3]

(4)

wherein each of p, q, r and s is independently an integer ranging from 0 to 200, p+q+r+s is an integer ranging from 3 to 200, each of the repeating units may be a straight chain or a branched chain, the respective repeating units may be bonded to each other at random, d is an integer ranging from 1 to 3, and each of the units ($-C_dF_{2d}-$) may be independently a straight chain or a branched chain.

4. The fluoropolyether group-containing polymer-modified organic silicon compound according to claim 1, wherein, in the formula (1) or (2), each of $Y_1$ and $Y_2$ is independently a $C_{2-10}$ alkylene group.

5. The fluoropolyether group-containing polymer-modified organic silicon compound according to claim 1, wherein, in the formula (1), Z is at least one kind selected from a hydrogen atom and below-described groups:

[Chem. 5]

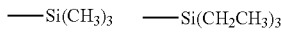 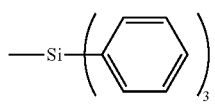

[Chem. 6]

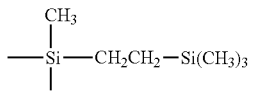

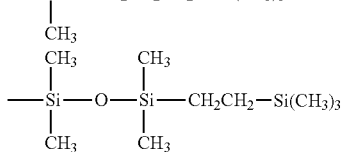

[Chem. 7]

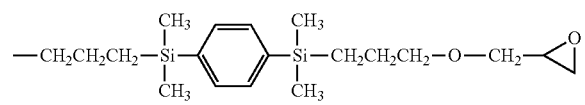

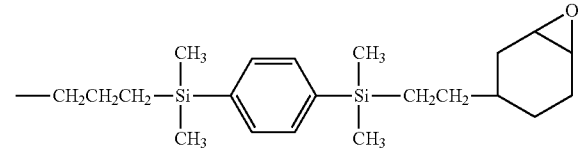

[Chem. 8]

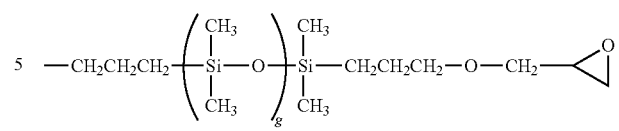

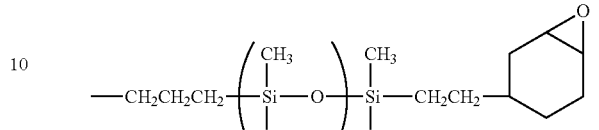

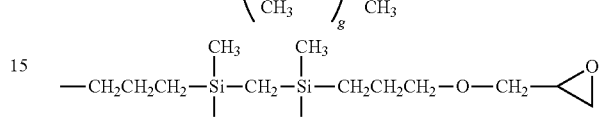

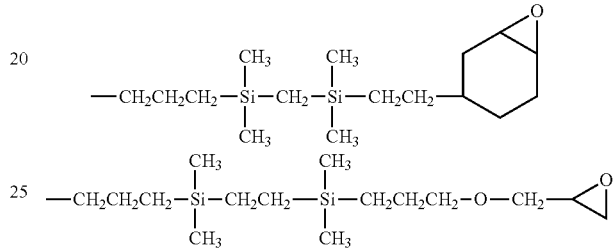

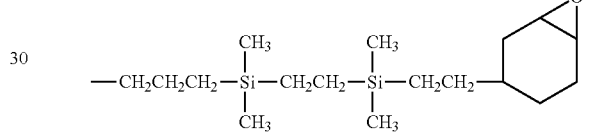

wherein g is an integer ranging from 1 to 20.

6. The fluoropolyether group-containing polymer-modified organic silicon compound according to claim 1, wherein the fluoropolyether group-containing polymer-modified organic silicon compound represented by the formula (1) or (2) is represented by any of following formulae:

[Chem. 9]

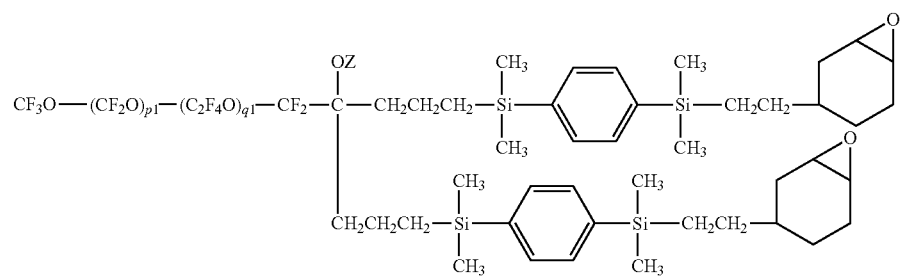

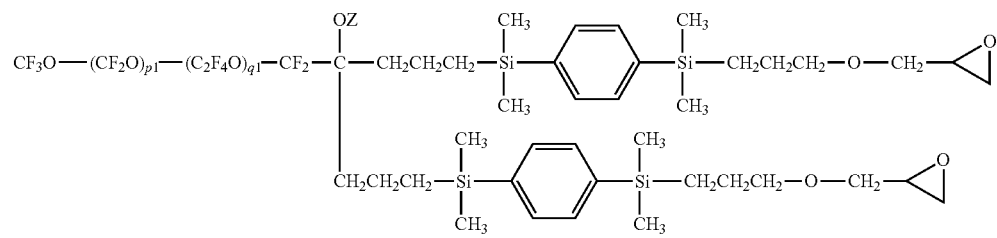

-continued
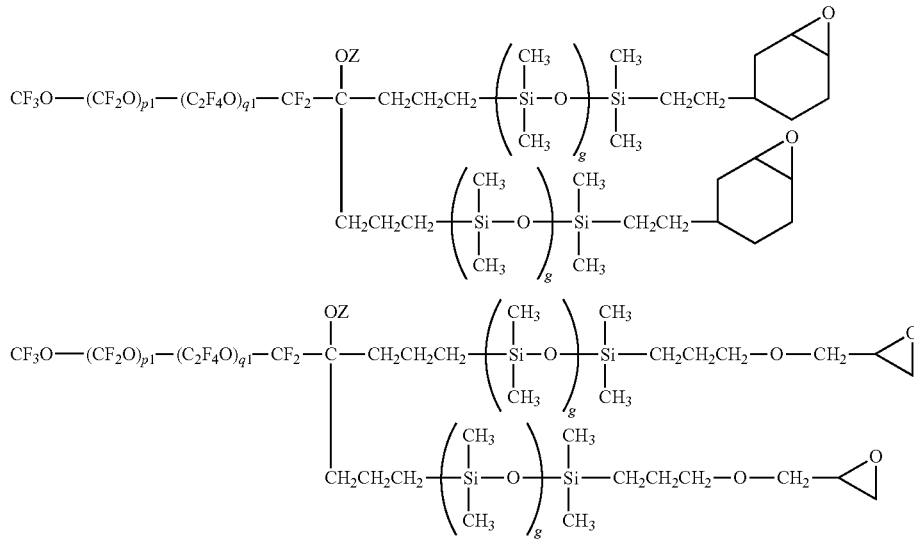
[Chem. 10]
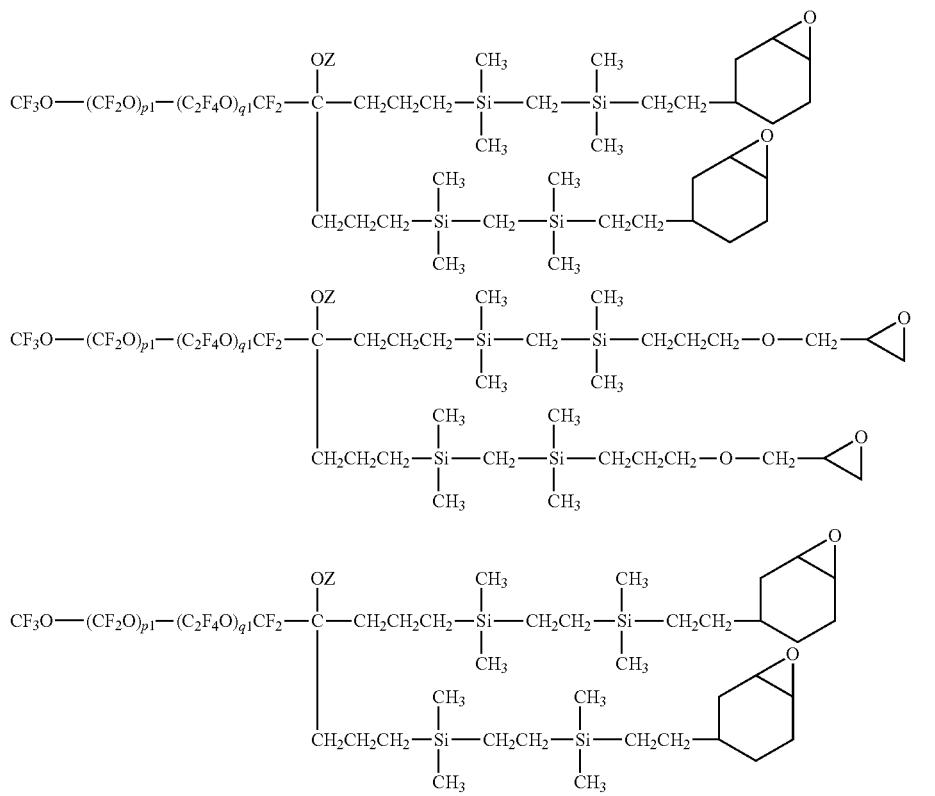
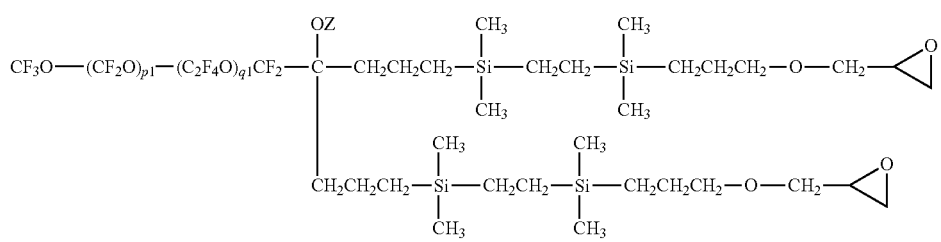

[Chem. 11]
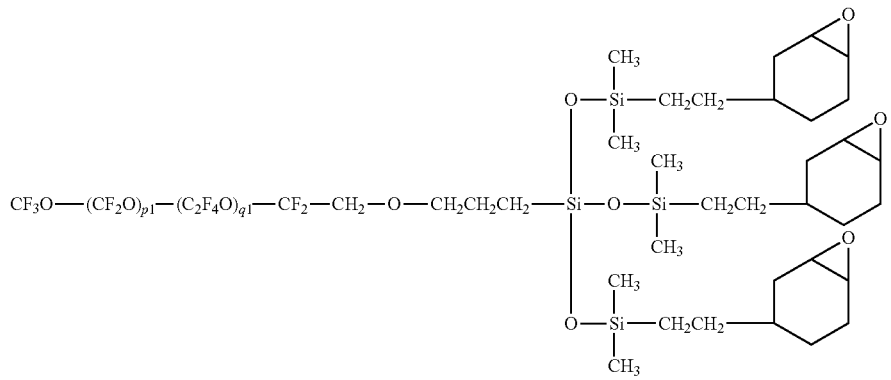
[Chem. 12]
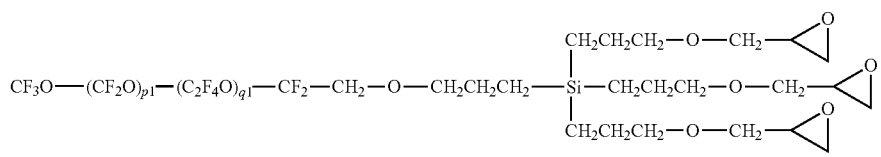
[Chem. 13]
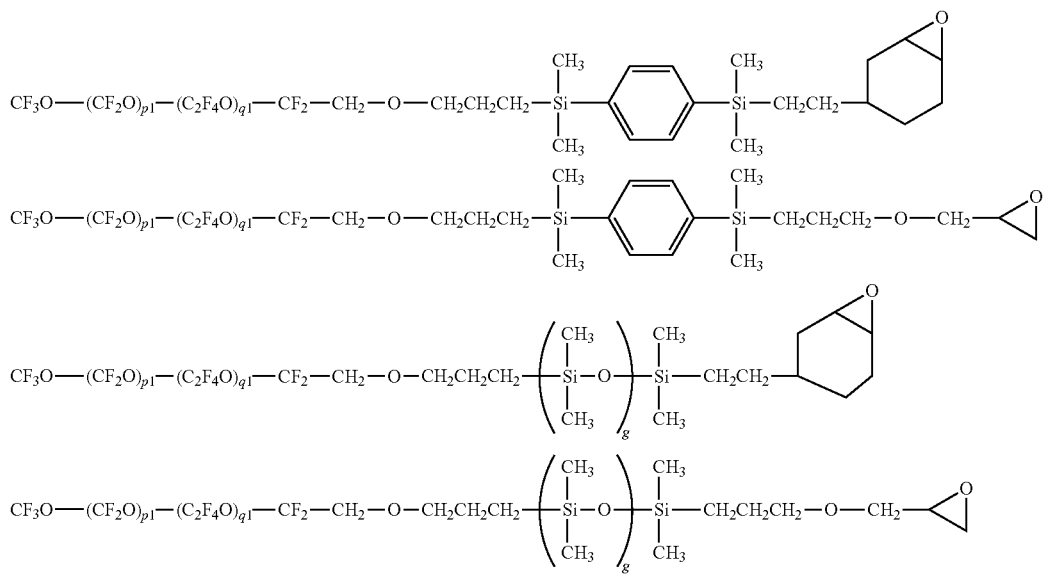
[Chem. 14]
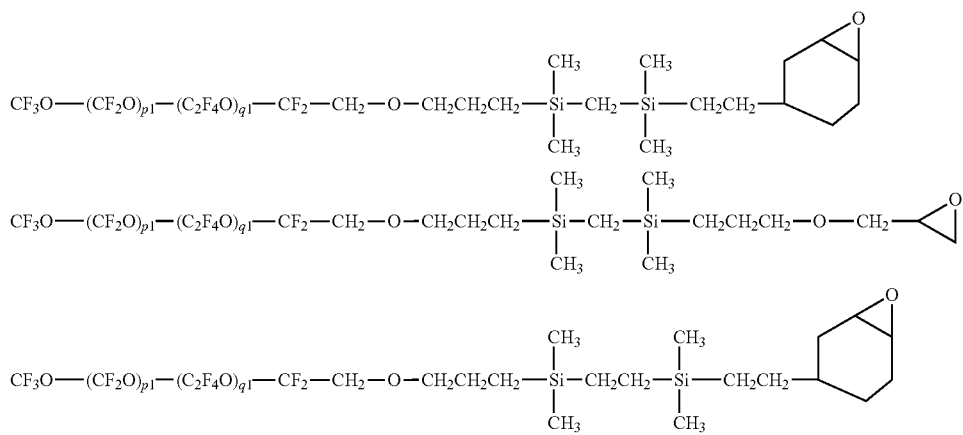

-continued
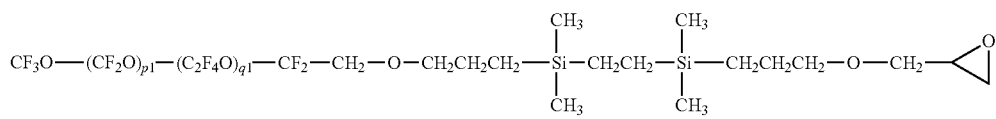
[Chem. 15]
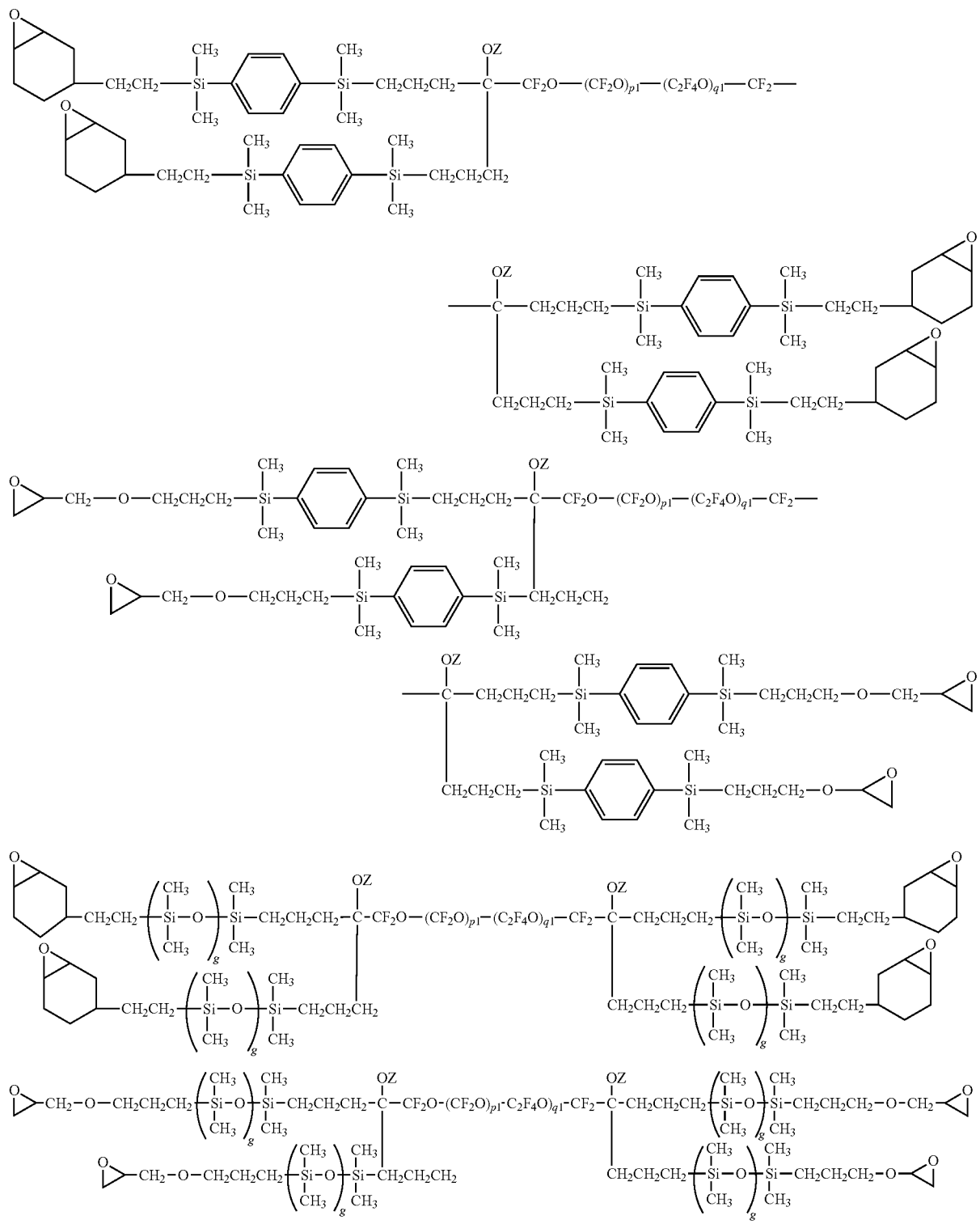

[Chem.16]

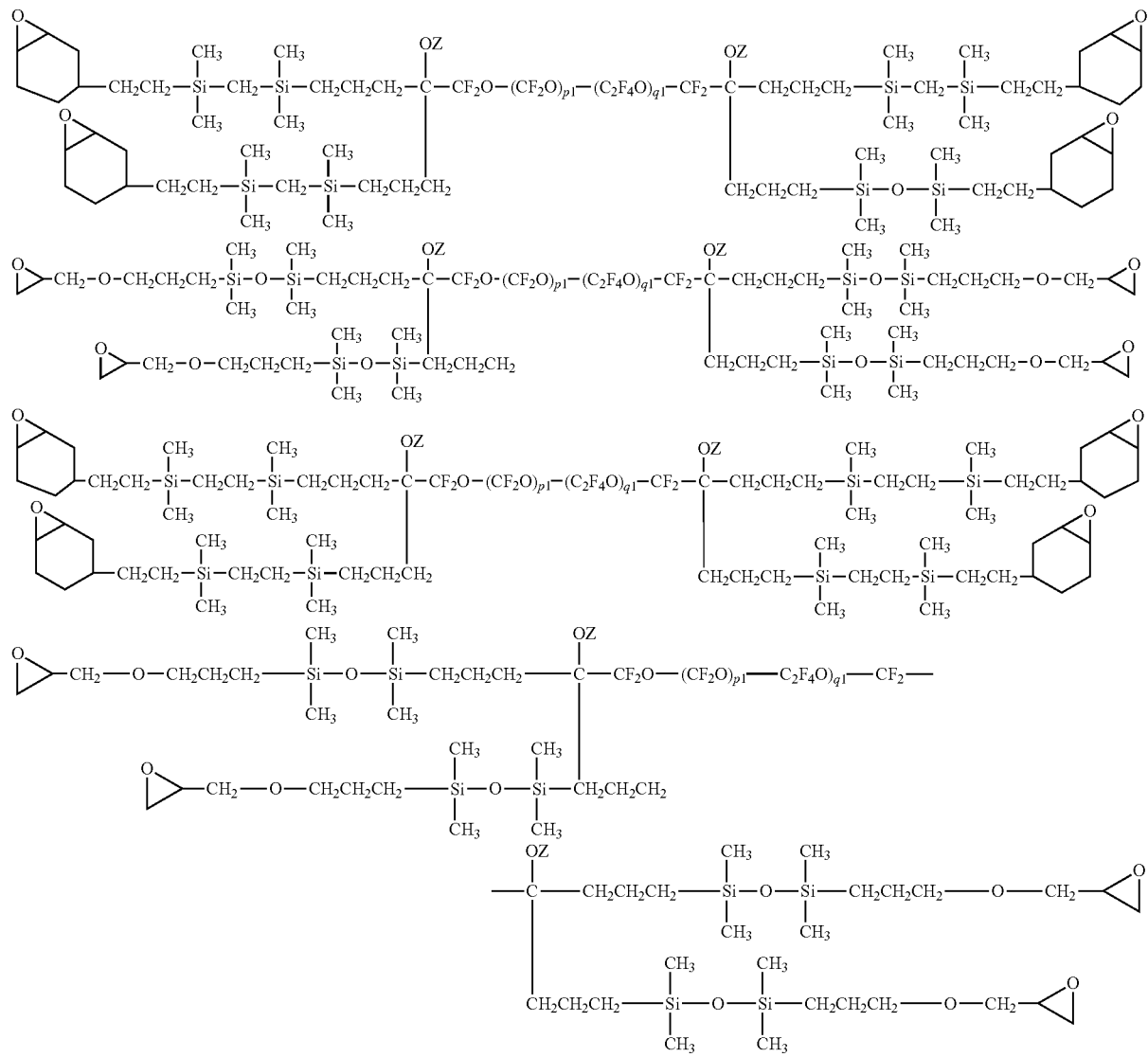

wherein Z is the same as above, p1 is an integer ranging from 5 to 100, q1 is an integer ranging from 5 to 100, p1+q1 is an integer ranging from 10 to 105, and the respective repeating units may be bonded at random, and g is an integer ranging from 1 to 20.

7. A surface treatment agent comprising the fluoropolyether group-containing polymer-modified organic silicon compound according to claim 1.

8. The surface treatment agent according to claim 7 further comprising a fluoropolyether group-containing polymer represented by a following general formula (5):

$$A\text{-}Rf''\text{-}A \qquad (5)$$

wherein A is a fluorine atom or a monovalent fluorine-containing group having —$CF_3$ group at a terminal, and Rf″ is a divalent fluorooxyalkylene group-containing polymer residue.

9. An article comprising a cured film of the surface treatment agent according to claim 8 on a surface.

* * * * *